(12) United States Patent
Touma et al.

(10) Patent No.: US 10,433,033 B2
(45) Date of Patent: *Oct. 1, 2019

(54) WIRELESS MOTION SENSOR SYSTEM AND METHOD

(71) Applicant: Pierre A. Touma, Austin, TX (US)

(72) Inventors: Pierre A. Touma, Austin, TX (US); Hadi Murr, Beirut (LB); Elias Bachaalany, Halat (LB); Imad Maalouf, El Metn (LB)

(*) Notice: Subject to any disclaimer, the term of this patent is extended or adjusted under 35 U.S.C. 154(b) by 0 days.

This patent is subject to a terminal disclaimer.

(21) Appl. No.: 15/851,711

(22) Filed: Dec. 21, 2017

(65) Prior Publication Data

US 2018/0139518 A1    May 17, 2018

Related U.S. Application Data

(63) Continuation of application No. 15/070,189, filed on Mar. 15, 2016, now Pat. No. 9,900,669.

(51) Int. Cl.
*H04Q 9/00* (2006.01)
*A63B 24/00* (2006.01)
(Continued)

(52) U.S. Cl.
CPC ............ *H04Q 9/00* (2013.01); *A01K 29/005* (2013.01); *A63B 24/0003* (2013.01);
(Continued)

(58) Field of Classification Search
CPC .. A01K 11/008; A01K 29/005; A01K 13/006; A01K 13/008; A01K 15/021; A01K 27/006; A61B 5/112; A61B 5/1122
See application file for complete search history.

(56) References Cited

U.S. PATENT DOCUMENTS 4,787,051 A    11/1988  Olson
4,839,838 A    6/1989   LaBiche et al.
(Continued)

OTHER PUBLICATIONS

Marcelo H Ang et al, Singularities of Euler Roll-Pitch-Yaw Representations. IEEE Transactions on Aerospace and Electronic Systems, vol. AES-23, No. 3, May 1987. pp. 317-323.
(Continued)

*Primary Examiner* — Mirza F Alam

(57) ABSTRACT

A motion analysis system comprises a human wearable peripheral, a human wearable communication hub, a beacon, a data analysis server, and a cloud server. The peripheral comprises an orientation sensor that comprises an accelerometer, a magnetometer, and a gyroscope. The peripheral further comprises a processor and a wireless communication module. The hub comprises a communication module that communicates with the peripheral, as well as a sensor and a second wireless communication module. The beacon comprises a sensor and a communication module that communicates with the second communication module of the hub. The data analysis server communicates with the beacon and receives information from the beacon sensor, the hub sensor, and the orientation sensor. The data analysis server further comprises an internet connection with which the data analysis server can communicate with the cloud server. The cloud server is configured to assess a risk factor in response to the orientation sensor, the hub sensor, and the beacon sensor.

20 Claims, 20 Drawing Sheets

(51) Int. Cl.
*A01K 29/00* (2006.01)
*G08C 17/02* (2006.01)
*A63B 43/00* (2006.01)

(52) U.S. Cl.
CPC .......... *A63B 24/0062* (2013.01); *A63B 43/00* (2013.01); *G08C 17/02* (2013.01); *H04Q 2209/43* (2013.01); *H04Q 2209/823* (2013.01); *H04Q 2209/883* (2013.01)

(56) References Cited

U.S. PATENT DOCUMENTS

| | | | |
|---|---|---|---|
| 5,440,326 A | 8/1995 | Quinn | |
| 5,506,605 A | 4/1996 | Paley | |
| 5,703,623 A | 12/1997 | Hall et al. | |
| 5,825,350 A | 10/1998 | Whipple | |
| 5,898,421 A | 4/1999 | Quinn | |
| 6,072,467 A | 6/2000 | Walker | |
| 6,127,990 A | 10/2000 | Zwern | |
| 6,249,274 B1 | 6/2001 | Svancarek et al. | |
| 6,347,290 B1 | 2/2002 | Barlett | |
| 6,545,661 B1 | 4/2003 | Goschy et al. | |
| 6,597,443 B2 | 7/2003 | Boman et al. | |
| 6,721,738 B2 | 4/2004 | Verplaetse et al. | |
| 6,754,596 B2 | 6/2004 | Ashe et al. | |
| 6,847,351 B2 | 1/2005 | Noguera et al. | |
| 6,856,327 B2 | 2/2005 | Choi et al. | |
| 6,861,946 B2 | 3/2005 | Verplaetse et al. | |
| 8,554,495 B2 | 10/2013 | Mack et al. | |
| 8,702,516 B2 | 4/2014 | Bentley et al. | |
| 8,860,570 B2 | 10/2014 | Thomas et al. | |
| 9,129,499 B2 | 9/2015 | Howard et al. | |
| 9,208,692 B2 | 12/2015 | Considine et al. | |
| 2003/0163287 A1* | 8/2003 | Vock | A43B 3/0005 702/187 |
| 2004/0070564 A1 | 4/2004 | Dawson | |
| 2004/0095317 A1 | 5/2004 | Zhang et al. | |
| 2004/0182925 A1* | 9/2004 | Anderson | B07C 3/20 235/385 |
| 2004/0212941 A1 | 11/2004 | Chen | |
| 2004/0222976 A1 | 11/2004 | Muresan et al. | |
| 2004/0227725 A1 | 11/2004 | Guiseppe et al. | |
| 2005/0052414 A1 | 3/2005 | Park et al. | |
| 2005/0145187 A1* | 7/2005 | Gray | A01K 11/008 119/174 |
| 2005/0243062 A1 | 11/2005 | Liberty | |
| 2006/0284839 A1 | 12/2006 | Breed et al. | |
| 2008/0025072 A1* | 1/2008 | Tamai | G11C 8/10 365/148 |
| 2008/0036610 A1* | 2/2008 | Hokuf | A01K 11/008 340/573.3 |
| 2008/0167985 A1* | 7/2008 | Yarnall | G06Q 10/08 705/39 |
| 2015/0005674 A1 | 1/2015 | Schindler et al. | |
| 2015/0038803 A1 | 2/2015 | Uhlig et al. | |
| 2015/0040669 A1 | 2/2015 | Borkholder et al. | |
| 2015/0348591 A1 | 12/2015 | Kaps et al. | |
| 2016/0021506 A1* | 1/2016 | Bonge, Jr. | A01K 27/009 717/173 |
| 2016/0066847 A1 | 3/2016 | Sales et al. | |
| 2016/0302393 A1* | 10/2016 | Pradeep | A01K 27/001 |

OTHER PUBLICATIONS

Sebastion O.H. Madgwick, An Efficient Orientation Filter for Inertial and Inertial/Magnetic Sensor Arrays. Apr. 30, 2010. Downloaded from X-IO Technologies website (http://www.x-io.co.uk).
Sebastion O.H. Madgwick, Quaternions. Sep. 24, 2011. Downloaded from X-IO Technologies website (http://www.x-io.co.uk).
Noel H. Hughes, Quatemion to Euler Angle Conversion for Arbitrary Rotation Sequence Using Geometric Methods. Accessed online from http://noelhughes.net/uploads/quat_2_euler_paper_ver3.pdf.

* cited by examiner

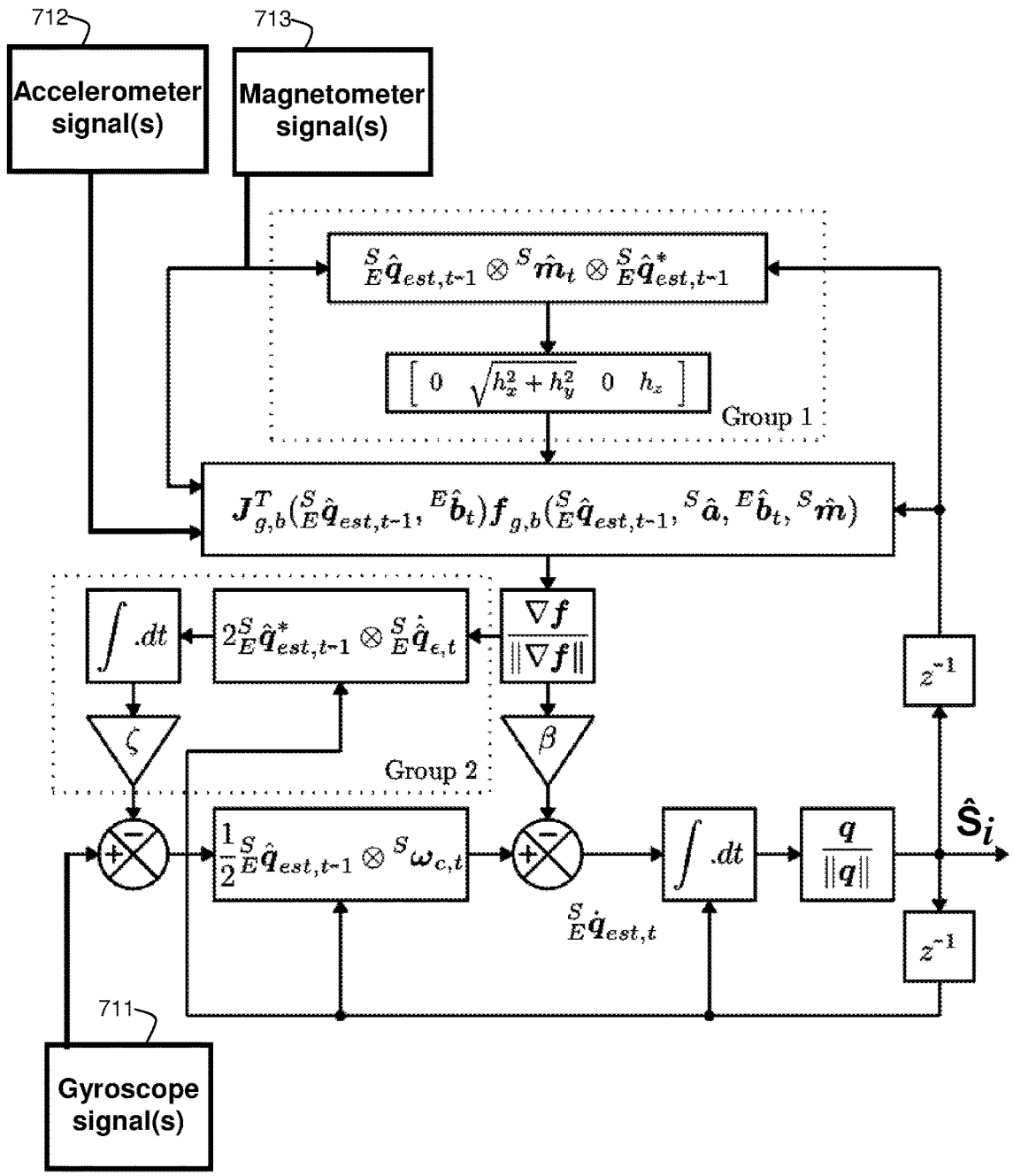
Fig. 16 (Madgwick filter)

WIRELESS MOTION SENSOR SYSTEM AND METHOD

CROSS REFERENCE TO RELATED APPLICATIONS

This application is a Continuation of and claims priority based on U.S. patent application Ser. No. 15/070,189 filed Mar. 15, 2016, the entire disclosures of which are incorporated by reference herein for all purposes.

BACKGROUND

The present invention relates to systems and methods that comprise an electronic motion-sensing instrument configured to wirelessly communicate to another electronic device.

It is desired to combine sensors and a transmitter into a small, low-cost, and low power motion-sensing instrument. By adding wireless transmission capability to this instrument, it is possible to use the instrument for a variety of tasks that require a small portable device. For example, the instrument could be worn or held by a person. The wireless transmission capability can allow a remote electronic receiving device to receive data from the instrument on a continuous basis and use this instrument data for analysis, feedback, and/or control. The example system comprising the instrument and the receiving device could be used to continuously monitor and record motion and other parameters before and after the occurrence of an unpredictable event, so that a complete picture of before, during, and after the event can be analyzed. Data from the instrument could be used to trigger an alarm.

BRIEF DESCRIPTION OF THE DRAWINGS

In the accompanying drawings:

FIG. 16 shows a Madgwick filter using magnetometer, accelerometer, and gyroscope inputs (MAGI);

Figure 1:
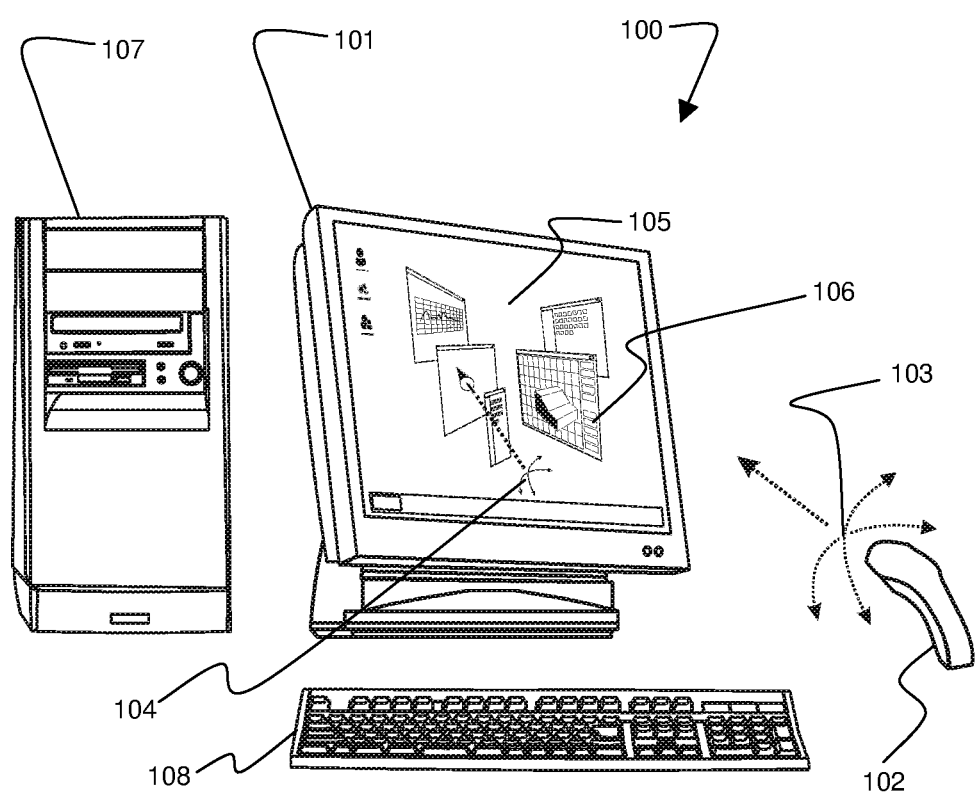
FIG. 1 shows a 3D input device used in a 3D computer system.

It should be understood that the drawings are not necessarily to scale. In certain instances, details that are not necessary for an understanding of the invention or that render other details difficult to perceive may have been omitted. It should be understood that the invention is not necessarily limited to the particular embodiments illustrated herein.

DETAILED DESCRIPTION OF THE EMBODIMENTS

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It should be understood that various changes could be made in the function and arrangement of elements without departing from the spirit and scope as set forth in the appended claims.

Specific details are given in the following description to provide a thorough understanding of the embodiments. However, it will be understood by one of ordinary skill in the art that the embodiments may be practiced without these specific details. For example, the present invention may be implemented using any combination of computer programming software, firmware, or hardware. As a preparatory step to practicing the invention or constructing an apparatus according to the invention, the computer programming code (whether software or firmware) according to the invention can be embedded in one or more machine readable storage devices such as micro-controllers, programmable logic and programmable analog devices, flash memories, semiconductor memories such as read-only memory (ROM), programmable read-only memory (PROM), etc., thereby making an article of manufacture in accordance with the invention. The article of manufacture containing the computer programming code can be used by either executing the code directly from the storage device, or by transmitting the code according to the present invention with appropriate standard computer hardware to execute the code contained therein. An apparatus for practicing the invention could be one or more devices having network access to computer program(s) coded in accordance with the invention.

1. Overview

One embodiment, the present invention relates to an electronically networked system or method that integrates a wearable instrument comprising a plurality of sensors. The sensors can include MEMS (micro electro mechanical systems) devices. The sensors can include transducers that measure position, motion, acceleration, impact, temperature, heart rate, pulse, and/or breathing activity. Position, motion, acceleration, and/or impact could be measured using any combination of systems and methods including, but not limited to the global positioning system (GPS), cellular or Wi-Fi triangulation, time-of-travel, magnetics, optics, and/or acceleration technologies. The sensors could be stand-alone or structured in a matrix for operational redundancy, maximum availability, and improved accuracy. Sensors with different functions and/or technologies could be combined in one solid-state module and the matrix could contain a number of such modules. The instrument can also comprise a central processing unit (CPU) comprising a microprocessor, micro-controller, digital signal processor, graphics processing unit, field programmable gate array, application specific integrated circuit, system on a chip, and/or similar microelectronic circuit. The CPU can use embedded algorithms and/or other firmware code to process the data generated by the sensors, manage power consumption, and communicate internally and externally. The instrument can also comprise a transmitter that can use protocols such as Bluetooth, near field communications, Wi-Fi, ZigBee, radio-frequency communications, cellular communications, satellite communications, and/or any other wireless communications protocol or technology capable of being understood by anyone skilled in the art, to communicate with a device at a remote location. The remote device could be a second wearable instrument, a remote control unit, and/or a remote display device such as a portable computer, a laptop computer, a telephone, a tablet computer, see-through glasses, or virtual reality goggles. The system could interface with and/or use an instrument and/or a remote device that uses a standard computer operating system such as Unix™, Linux™, Microsoft™ Windows™, Android™, iOS™, and/or MacOS™.

The system or method could provide the sensor data in a raw format for further analysis with spreadsheets or dedicated software. The system or method could show the sensor data in a graphical form via a user-friendly graphical user interface (GUI). The sensor data could be stored for real-time or later viewing. The sensor data could also be aggregated in anonymous format on a secure and encrypted database located on a server on the internet (i.e. a "cloud database"). The cloud database could aggregate sensor data from different wearable instruments, located in different geographical areas. The sensor data in the cloud database could be processed via embedded intelligence and smart algorithms enabling big data analysis on the aggregated anonymous data, for the improvement of monitoring and evaluation thresholds and the generation of personalized risk, fatigue or performance factors.

2. Pointing Device Embodiments

One embodiment of the present embodiment relates to pointing (I/O) devices used to position or manipulate a vectorial object. For example, embodiments could be used to control an object (i.e. controlling object attributes such as position, orientation, and/or size) on a display for two dimensional (2D) or three-dimensional (3D) environments. Vectorial objects can be vectorial cursors, graphical symbols, or any pictorial representation of physical or virtual object or character having one or multiple dimensions that has both a linear component (such as magnitude [or size], or position in a Cartesian space) and an angular component (such as orientation). In particular, one embodiment of the present invention relates to handheld devices that can be used to position or manipulate a vectorial object such as a vectorial cursor or 3D objects/characters in 3D space. A vectorial cursor in 3D is the analog of a cursor in 2D. It is shaped like an arrow giving the user spatial feedback of the direction and position of the cursor. Depending on the application, the length of the arrow could be variable or fixed, whereby the arrow would be either extending from a spherical (polar) coordinates point of reference, or virtually moving in the 3D space. Thus, one embodiment might be an inertial sensor-based application that operates as a 3D mouse to provide a natural and ergonomic way to interact with 3D environments and to control systems in 3D space. The 3D mouse could act as a spatial pointer input device and/or controller to reach and/or manipulate objects, icons, and/or characters in 3D environments. The 3D environments could be generated by 3D graphical rendering or 3D GUIs with 2D monitors, volumetric monitors, stereoscopic monitors, holographic monitors, and/or any other 2D or 3D monitor capable of being understood by anyone skilled in the art.

Such an embodiment of the present invention can be based on inertial technology and methods that determine the position of a cursor in a 2D or 3D environment on a 2D or 3D display. The inertial sensor(s) could include accelerometers, magnetic sensors, and gyroscopes. Position of the cursor can be determined by mapping the movement of an operator's hand in space onto a polar coordinates frame of reference, thus optimizing the number of inertial sensors needed and reducing manufacturing cost. In such an embodiment, the application of the technology can use a single accelerometer in a form factor allowing it to be used as a desktop mouse, a freestanding remote controller, and/or a game controller. In addition to its role as a mouse for the interaction with 3D environments and 3D GUIs, the device/technology can have the capability to act as a universal remote controller for 2D and/or 3D entertainment or media centers.

In another embodiment, the same approach could be used with a glove-like application allowing the user to interact with both 2D and 3D environments by limited movements of the hand and/or fingers. In a further embodiment, this approach could act as an advanced game controller for 3D games. Embodiments could be coupled with haptic feedback. Furthermore, embodiments of the system or method could be applied in combination with portable game consoles (Gameboy, PSP . . . ) allowing players to interact with mobile games through movements of the console itself, in combination with triggers. The triggers could be push buttons. The triggers could be symbols on a screen. Embodiments could be useful with handheld computers and portable phones (such as cellular phones) allowing navigation through 2D or 3D interface menus by moving the device itself instead of using a stylus or the operator's fingers. Thus, the technology also has the capability to be embedded in various electronic devices including wearable and hand-held devices to generate motion signals for remote applications or built-in applications that can be rendered on an attached display. This means that embodiments of the present invention technology could be embedded in a portable/mobile media or communications devices, mobile phones, smartphones, and/or tablet computers. The technology could be used for things such as screen positioning and sizing, information exchange, and applications to remotely control consumer devices.

Another embodiment of the technology would be as an add-on to game-specific sports hardware for sports games (examples of which include baseball bat, golf club, tennis racket, skateboard, skis, luge, running, cycling, football, soccer, basketball, etc.). In yet another embodiment, the technology could be applied for the control of unmanned aerial vehicles (UAVs) and other remote controlled aircraft and/or their embedded systems such as cameras/other detection equipment. Embodiments could be used to control other unmanned devices. The same embodiment is applicable to the control of model toys (aircraft, cars, boats, etc.). A person familiar with the art would also find that the technology has also applications in the field of medicine, engineering and sciences. It could be a virtual scalpel, a controller for a robotic arm, and/or a pointer for the manipulation of 3D molecules, for example.

The present invention can be implemented using a 3D Pointer concept. The three-dimensional pointer can be achieved by using a spherical coordinate system. A spherical coordinate system permits the user to access any point in a virtual environment by properly changing the device's directions and by increasing or decreasing the pointer length. The tilt angles, pitch and roll, captured from an inertial sensor (such as an accelerometer) can be are used respectively as Alpha and Beta angles of the spherical coordinate system as illustrated in the equations below. Orientation can be captured from the movement of a hand (or other body part on which the device is worn) by measuring the projection of the static gravity on the tilted accelerometer (or other type of inertial sensor). Pointer length, which is the physical analog of the radius R can be simulated by using a trigger pair on the device or other haptic input such as other hand movements and or lateral/translational movement of the device. For example, the user can change the length of the pointer to reach a desired point in 3D space by pressing the increase and decrease triggers. An alternative is to use a time varying pointer length. Combining orientation and pointer length, the instantaneous position of the end of the pointer in the inertial frame can be expressed as a function of the time-varying radius and spherical angles (Euler angle transformation).

$$X = R(t) \cdot \cos(\alpha) \cdot \sin(\beta)$$

$$Y = R(t) \cdot \sin(\alpha) \cdot \sin(\beta)$$

$$Z = R(t) \cdot \cos(\beta)$$

Like most 3D interfaces, it is important to distinguish between the inertial frame and the user frames. The inertial frame is considered as a reference and all objects in the 3D virtual environment are expressed with respect to it. Thus, the inertial frame is fixed. The x-axis is pointing to any convenient direction, the z-axis is pointing vertically upward and the y-axis is perpendicular to both. The user frame is the moveable system containing the pointer. It is defined by a rotation around the z-axis by $\psi$ and by the rotation around x and y by $\theta$ and $\Phi$. Moreover, the distance between those frames defines the offset of the pointer with respect to the inertial frame. The figure below illustrates those rotations (Euler angle transformations). The matrix linking between those two frames is the product of the following rotation matrix.

$$R = e^{(\hat{z}\times)\psi} e^{(\hat{y}\times)\theta} e^{(\hat{x}\times)\phi} = \begin{bmatrix} \cos(\psi) & -\sin(\psi) & 0 \\ \sin(\psi) & \cos(\psi) & 0 \\ 0 & 0 & 1 \end{bmatrix} \cdot$$

$$\begin{bmatrix} \cos(\theta) & 0 & \sin(\theta) \\ 0 & 1 & 0 \\ -\sin(\theta) & 0 & \cos(\theta) \end{bmatrix} \cdot \begin{bmatrix} 1 & 0 & 0 \\ 0 & \cos(\varphi) & -\sin(\varphi) \\ 0 & \sin(\varphi) & \cos(\varphi) \end{bmatrix}$$

After developing we get:

$$R_{IB} = \begin{bmatrix} \cos(\psi)\cdot\cos(\theta) & \cos(\psi)\cdot\sin(\theta)\cdot\sin(\varphi) - \sin(\psi)\cdot\cos(\varphi) & \cos(\psi)\cdot\sin(\theta)\cdot\cos(\varphi) - \sin(\psi)\cdot\sin(\varphi) \\ \sin(\psi)\cdot\cos(\theta) & \sin(\psi)\cdot\sin(\theta)\cdot\sin(\varphi) - \cos(\psi)\cdot\cos(\varphi) & \sin(\psi)\cdot\sin(\theta)\cdot\cos(\varphi) - \cos(\psi)\cdot\sin(\varphi) \\ -\sin(\theta) & \cos(\theta)\cdot\sin(\varphi) & \cos(\theta)\cdot\cos(\varphi) \end{bmatrix}$$

In one embodiment of the present invention, the 3D interface is used to create the virtual reality scene needed to interact with the 3D pointer. This interface is developed in an expandable mode in order to permit any improvement in the future. This interface allows the user to interact with the 3D objects, to change the colors of the ground and the pointer, to change the render mode between wire frame, hidden, and rendered, to change the view angles and the light intensity, or any other object characteristic.

It is important to mention that the yaw angle can be changed directly from the pointing device in order to make the navigation easier. To avoid the use of additional sensing components, such as a magnetic sensor or gyroscope, it is possible to simulate the yaw dimension by a rotation of the field of view. This field of view rotation can be accomplished by the manipulation of the graphical perspective through the interface software, by a pair of control buttons on the device itself, and/or by means of other user input. Thus, the yaw angle can be generated without a gyroscope, by using a gyroscope, by using a magnetic sensor, or by adding signals from multiple sensing components. Similarly, gyroscope pitch and roll signals could complement the pitch and roll signals generated by the accelerometer.

In one embodiment of the present invention, we can use an inertial sensor to detect tilt accelerations that will then be converted into movement. In this particular embodiment, we are using a MEMS accelerometer developed by Analog Devices, the ADXL202E MEMS accelerometer. Any similar inertial sensor including thermal accelerometers could be used. The ADXL202E is a low-cost, low-power, complete two-axis accelerometer with a digital output, all on a single monolithic IC. The ADXL202E can measure both dynamic acceleration (e.g., vibration) and static acceleration (e.g., gravity). The outputs are analog voltage or digital signals whose duty cycles (ratio of pulse width to period) are proportional to acceleration. A microprocessor counter, without an A/D converter or glue logic, can directly measure the duty cycle outputs. The duty cycle period is adjustable from 0.5 ms to 10 ms via external timing resistor.

The ADXL202E is a complete, dual-axis acceleration measurement system. For each axis, an output circuit converts the analog signal to a duty cycle modulated (DCM) digital signal that can be decoded with the timer port of the microprocessor used. The ADXL202E is capable of measuring both positive and negative accelerations to at least ±2 g. The accelerometer can measure static acceleration forces such as gravity, allowing it to be used as a tilt sensor as used in our application. Acceleration will result in an output square wave whose amplitude is proportional to acceleration. Phase sensitive demodulation techniques are then used to rectify the signal and determine the direction of the acceleration.

One of the most popular applications of the ADXL202E is tilt measurement. An accelerometer uses the force of gravity as an input vector to determine orientation of an object in space. An accelerometer is most sensitive to tilt when its sensitive axis is perpendicular to the force of gravity, i.e., parallel to the earth's surface. At this orientation, its sensitivity to changes in tilt is highest. When the accelerometer is oriented on axis to gravity, i.e., near its +1 g or −1 g reading, the change in output acceleration per degree of tilt is negligible. When the accelerometer is perpendicular to gravity, its output will change nearly 17.5 mg per degree of tilt, but at 45° degrees, it is changing only at 12.2 mg per degree and resolution declines. Because the accelerometer is sensitive to the static gravity, it can be used to measure tilt angles (pitch and roll) by measuring the projection of the vector g over each axis of the accelerometer.

When the accelerometer is oriented so both its X-axis and Y-axis are parallel to the earth's surface the accelerometer can be used as a two axis tilt sensor with a roll and a pitch axis. Once the output signal from the accelerometer has been converted to an acceleration that varies between −1 g and +1 g, the output tilt in degrees is calculated as follows:

$$\text{Pitch} = A\text{Sin}\left(\frac{Ax}{1\,g}\right)$$

$$\text{Roll} = A\text{Sin}\left(\frac{Ay}{1\,g}\right)$$

In one embodiment of the present invention the 3D hand held input device that captures the movement of a hand in free space and controls the movement of a vectorial cursor, object or character in an application on a monitor, or a system in physical space. Thus, the device can be thought of as a 3D mouse, or more generally as a controller. The 3D input device uses an inertial sensor, which allows the 3D input device to be self-contained without the need for beacons or emitters/receivers to detect generated signals, as the case would be with typical acoustic, magnetic or optical approaches. The 3D input device could also be complemented by acoustic, magnetic or optical sensing technologies. More specifically the 3D input device can be a handheld device that captures the movement of a hand in free space and controls the movement of a cursor, a button, an icon or any object or modifies object characteristics, on a display such as an LCD, LED or Plasma monitors or TV sets. The display may be remote or attached to the device. The control signal can be relayed via a wired connection or via Infrared, Bluetooth, radio-frequency communications, or any other wireless technology such as near field communication in proximity-based applications.

Practically, the 3D input device could be used as a mouse for 3D GUIs and volumetric monitors, a controller for 3D games, a pointer for interactive presentations or as a remote controlling device for the upcoming personal computer entertainment sensors that combine a television, a computer and a home theatre. The wireless transmission range of the 3D input device can depend on that of the wireless technology used. The 3D input device can also be a wired device connected electrically to a computing device.

The control functionality of the 3D input device could be extended to controlling other household peripherals such as telecommunications, lighting, irrigation, security system, heating/cooling or even car start-up in the morning. This would be done through a software user interface (Windows, Linux etc.) that would appear on a display such as a large plasma (or other) screen with this screen playing the role of a TV, computer monitor and command and control interface. In this respect, the 3D input device could be the future universal remote controller for the next generation of consumer appliances that would be controlled through a central computer (network of computers), instead of each having its own micro-controller and remote controlling device. The complexity of remote controllers would then be in the software interface that would be made more intuitive (and ideally in 3D) than the scroll down menu interface and large number of buttons currently available.

As the 3D input device also has a spatial capability with the needed degrees of freedom, it is a suitable device for the new generation of 3D monitors (e.g., stereographic, holographic and volumetric). The 3D capability is achieved through a limited amount of hand movements (such as rotations and translations) that would allow the alignment of a feedback vector (vectorial cursor) with the object to be reached, on the monitor. Practically, the alignment is done by varying the vertical and horizontal angles of the ray, in a polar frame of reference. Once the alignment is achieved, the 3D input device can extend the ray whereby the end of the ray could reach the object, thus enabling it for further manipulation. This approach allows an optimization of needed electronics whereby only one inertial device may be needed for basic 3D functionality.

The 3D capability of the device would also enable a new generation of virtual reality applications (in this case a haptic feedback might be added), Industrial and military simulations, advanced 3D computer aided design and computer aided manufacturing (CAD/CAM), medicine, molecular chemistry, bio-informatics, etc. For these types of applications, the self-contained and wearable characteristic of the technology would be a strong enabling factor.

One particular embodiment of the invention, relying on its wearable characteristic and with applications in medicine, virtual reality, military and industry is a digital glove (i-glove, e-glove). Such a glove would allow consumer, military, medical, and industrial users a seamless interaction with physical and virtual displays and objects, including the activation of virtual push buttons, knobs, and the selection, activation and manipulation of icons and virtual objects, characters of various forms and shapes or object characteristics.

In gaming and simulation applications, the e-glove can allow users the use of actual sports or military equipment to simulate operation in a virtual environment. For example, soldiers will use their own gear in a serious gaming environment for group training in realistic conditions. Sports players would use their own gear for virtual training and coaching.

In another application, the e-glove can enable real-life simulation of medical surgeries and other medical interventions for surgical preparation or teaching applications. In this application, the technology may be coupled with haptic feedback allowing the users to operate on virtual bodies and organs. These bodies and organs would be accurate rendering from the actual patients organs, rendered through high-resolution 3D imagery of the patient's body.

In one industrial application, the e-glove can allow the remote control of a five-fingered robotic arm in a natural manner. While having visual feedback from the scene of operation, the operator will move his hand using translational, rotational, flexing and grasping movements. These movements and gestures will be conveyed wirelessly or via a wired link to the robotic arm, allowing the operator to accurately and naturally control the movement of the robotic arm and its individual fingers.

In a particular application in aviation, the e-glove can enable air crew with virtual typing and virtual sign capability and that of annotating the real world with hand-motions that become geo-registered icons on the displays of all air crews and ground team members simultaneously. Technically, the glove could incorporate at least one accelerometer. More accelerometers may be required in the case of a fingered robotic arm. A gyroscope and a magnetometer may be useful additions to improve tracking of the translational, rotational, flexing and grasping movements of the hand and arm wearing the glove. This can allow the hand to navigate within the frame of a 3D GUI activate switches and buttons on different planes of the virtual interface in use. At least one of the glove fingers can incorporate a sensor that can control a virtual cursor in 3D space. The finger can be able to move the virtual cursor to activate icons that could be rendered with a 3D GUI. It will also enable users to type commands, reports etc., by a simple movement of the fingers in air or light tapping on a solid surface.

The glove fingers may be lined with fiber optics or Neoprene bend sensors to sense the bending of the fingers. This would complement the sensors in the fingers allowing an accurate sensing of the fingers flexion for accurate control of robotic arms or full-fingers typing. The tip of at least three fingers could incorporate infrared LEDs to be used with camera-based motion-sensing technology to complement the self-contained motion sensing capability of the e-glove. For typing applications, a system of texting similar to the one in mobile phones where each finger would be able to selectively type different characters and numerals may be implemented. A photoelectric virtual keyboard is another option but lacks the self-contained capability of our approach. This typing application could be extended to consumer devices such as tablets enabling users with wearable keyboard capability, allowing them to type like on a regular keyboard, and needing only a hard surface.

In consumer and aviation applications, the e-glove can use existing camera technology to detect the triangular movement of the LEDs, allowing an accurate gesture and movement tracking in space. In the aviation application, the e-glove may be used with the cameras that are pervasive within the cockpits of advanced jet fighters. These cameras are used among other things to track the movements of pilot's helmets and adjust the view of weapons cameras accordingly. The same cameras could be used with the e-glove's infrared technology to detect the movement of the gloves and pilots gestures or parts thereof (individual fingers).

This 3D capability can also be an enabling factor for the next generation of game stations and game environments. A game controller enabled by this 3D technology could control characters (including their sizes, shapes, positions, orientations, and other characteristics such as speed and acceleration), in a 3D space or a 2D environment, with very natural movements.

In one particular embodiment, the technology could be embedded in a portable/mobile game device/system (similar to Gameboy, PlayStationPro, etc.) or portable computer and phone applications mentioned previously, adding 3D capability and control through hand movements and allowing the advent of 3D games controlled through movements of the game system itself, thus starting a paradigm shift in portable game systems.

In another embodiment, the technology could be embedded in game controllers that are shaped like sports equipment, (non-extensive list including golf clubs, tennis racquets, baseball bats, and/or boxing gloves), thus allowing the creation of realistic video games around sports themes. Similarly, the technology could be embedded in actual sports and tactical equipment, including wearable ones (gloves, goggles/glasses, helmets and shoes), allowing real-life sports or tactical simulation in a realistic environment. For example, the technology could be embedded in sports and military helmets to measure the rotational and translational effect of impacts on the helmet and the athlete's head. The technology could be combined with at least one gyroscope and one or more impact sensors such as three sensors for measuring movement in orthogonal directions or measuring orthogonal rotations). The sensor technology could be in the form of accelerometers capable of sensing impacts as well as detecting the magnitude, location and direction of the impact. A temperature sensor and GPS sensor could also be included. A memory module would be included for the storing data and a communications module included for the transmission of the data. In a performance related sports application, the technology embedded in a wearable form can detect the translational acceleration, speed and movement of the athletes, allowing side-line personnel to assess the performance and well-being status of each player in order to define the best game strategy.

In tactical, as well as cycling, motorcycling, horse riding, paragliding, parachuting and similar sports applications requiring wearable equipment such as helmets, gloves and goggles/glasses, the technology could be embedded in said helmets, gloves, and/or goggles/glasses. The additional sensors might include at least one gyroscope, at least one impact detector or accelerometers capable of detecting impact, a GPS receiver as well as sensors to monitor physiological and vital signals including but not limited to temperature, EEG, EKG, Pulse and similar physiological signals. A communications module could be included, allowing the transmission of rotational and translational movements of the helmet, the related acceleration/deceleration of the head as well as the position of the wearer and the generated physiological and vital signals. Signal transmission includes wired, wireless and satellite communications.

Other applications can include a remote controller for hobbyists or for military personnel who use unmanned systems such as unmanned air vehicles (UAVs), unmanned ground vehicles (UGVs), and/or unmanned water vehicles (UWVs). Such unmanned systems can use inertial measurement unit (IMUs) that detect pitch, roll, and yaw from one or more sensors. The use of multiple sensors generally makes the movement sensing more accurate and responsive.

In a related remote control application, the technology would be embedded in a hard shell impervious to nature's elements including water, dust and sand, allowing unmanned systems operators to reduce training time and naturally control their unmanned systems. In these types of applications, the controller could be complemented by a first person viewer system in the form of an attached camera to the unmanned system relaying a field of view to the operators via a set of goggles worn by the operator. Additional linear inputs on the device can allow a real time control of the mounted camera increasing the operator's field of view.

Wireless communications protocols such as WiFi, Bluetooth, and Near Field Communications (NFC) can be combined with other elements of the present invention for a variety of applications. One example is that a portable phone with motion sensing technology could operate as a key for opening a lock in a gate or as a gate opener whereby a rotation or tilting motion is transmitted along with the phone identification (ID) to a tag controlling a mobile lock via NFC. In hand-held gaming consoles enabled with motion sensing capability, NFC could enable motion-based multi-player games in which players would bump their game consoles to connect to a virtual local gaming network or would need to touch various NFC tags in a road rally. Wearable motion sensing modules enabled with NFC and embedded into sports equipment such as helmets, gloves, or shoes can provide information about the performance level and health status of athletes or the intensity of impact when coming into contact with devices having NFC tags. Wearable motion-sensing modules can also enable sports, training, or simulation environments such as two seniors walking or running on adjacent treadmills could be controlling characters running at proportional speeds in a countryside landscape with a virtual game-based landscape rendered on a display. Portable phones having motion sensing capability and NFC could be used to give or take money from a digital account based on specific motions of the phone such as an upward stroke meaning "upload money" and a downward stroke meaning "download money".

From a marketing perspective, the field seems ripe for the technology, especially technology that can be designed for cost-effective manufacturing. One embodiment of the present invention relies on bluetooth wireless communications and RS 232 connectivity. It is also possible to have wired USB connectivity and Wi-Fi (wireless) communications or any other enabling technology capable of being understood by anyone skilled.

Figures that Describe Pointing Device Embodiments

FIG. 1 shows a 3D computer system at 100. Referring to FIG. 1, a computer is shown at 107, a computer monitor is shown 101, and a computer keyboard is shown at 108. A 3D environment 105 and a set of 3D applications 106 are shown within the monitor 101. A 3D input device or Mouse/Controller 102 interacts with the 3D environment 105 by controlling a vectorial cursor 104. In the example shown here, the vectorial cursor 104 is shaped like an arrow giving the user spatial feedback of the direction and position of the cursor. Depending on the application, the length of the arrow could be extensible or fixed. In the embodiment shown here, the base of the arrow is a fixed origin of a spherical coordinate system and changes in the length of the vectorial cursor 106 are controlled through a linear input element comprising a pair of buttons on the input device 102, allowing a user to reach any point in the space depicted on the monitor 101. In an alternate embodiment, the location of the base of the arrow can be controlled through the input device allowing the entire arrow, or vectorial cursor 104 to move virtually in the 3D space, with the length of the arrow being either fixed or responsive to user input through the 3D input device. A linear input element used in such an input device 102 can be any single or multiple user-responsive components understood by anyone skilled in the art. Examples of linear input elements include a pair of push buttons, a slide switch, a touch pad, and a scroll wheel.

It should be noted that a computer system could be any system that includes an information-processing unit. Examples of computer systems include, but are not limited to personal digital assistants (PDAs), personal computers, mini-computers, mainframe computers, electronic games, and microprocessor-based systems used to control personal, industrial or medical vehicles and appliances.

The movement and control functions of the 3D Mouse/Controller 102 are shown as phantom lines at 103. The curved lines and arrows at 103 represent possible movements of the device held by the user. An upward or downward tilt (pitch) of the device would move the vectorial cursor 104 in a similar fashion on the screen, while a lateral tilt (roll) in a left-right manner would move the vectorial cursor 104 on the screen to the left or right. The magnitude of the vectorial cursor 104 is controlled using a pair of control triggers on the device. The combination of pitch, roll, and vector magnitude allow the user to reach any point in 3D space using spherical coordinates with a minimal amount of physical movement.

In one embodiment illustrated in FIG. 1, the 3D Mouse/Controller 102 is pointing at 3D applications 106 in 3D graphical user interface (GUI) 105 that are displayed on a monitor 101. In another embodiment, the 3D Mouse/Controller 102 could control one or more 3D graphical objects in a 3D games environment in the same manner. A graphical object can be a video game character or any other graphical symbol in a 3D environment. In that case, the physical embodiment of the controlling device 102 could look like a game controller and the 3D character would be substituted for the vectorial cursor 103. The vector magnitude derived from a linear input element in the Mouse/Controller 102 can be used to control the size or orientation of the graphical object.

In another embodiment, the Mouse/Controller 102 is a 2D input device working in radial coordinates. In this case, only one tilt angle and a minimum of one linear input are measured in the input device 102 to provide a 2D navigational device operating in radial coordinates. In yet another embodiment, the Mouse/Controller 102 is an input device with two linear input elements capable of changing a vector magnitude in perpendicular axes. These two perpendicular axis in conjunction with one tilt axis can generate a position in 3D space using cylindrical coordinates.

Figure 2A:
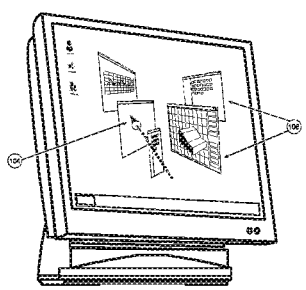
FIG. 2A shows the system of FIG. 1 with the 3D input device in a resting position and a vectorial cursor pointing at one object in the 3D environment.
Figure 2B:
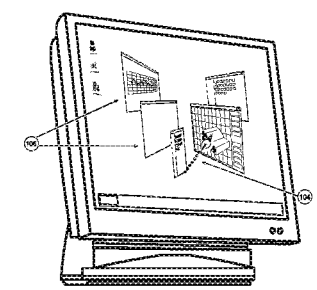
FIG. 2B shows the system of FIG. 1 with the 3D input device being tilted along the roll axis.
Figure 2C:
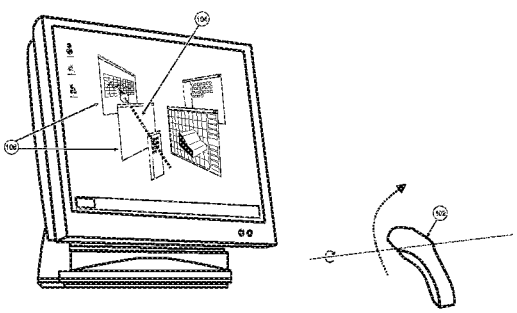
FIG. 2C shows the system of FIG. 1 with the 3D input device being tilted along the pitch axis.
Figure 2D:
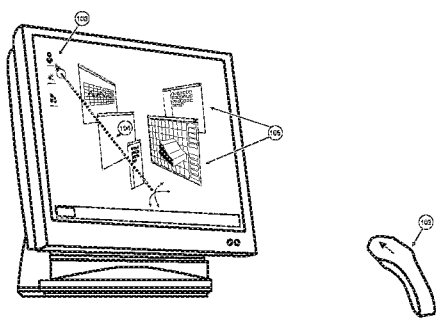
FIG. 2D shows the system of FIG. 1 with the vectorial cursor moving toward an object on the 3D display in response to linear input on the 3D input device.

FIGS. 2A, 2B, 2C, and 2D show the detailed movement of the 3D Mouse/Controller 102 and the related control of the vectorial cursor 104. FIG. 2A shows the initial state of the device 102 and vectorial cursor 104 pointing on one application 106. FIG. 2B shows a right rolling tilt of the device 102 that causes the vectorial cursor 104 to move right and point to another application 106 to the right of the initial one in FIG. 2A. FIG. 2C shows an upward tilt of the device 102 that causes the vectorial cursor 104 to move up and point to another application 106 above of the initial one in FIG. 2B. FIG. 2B shows the extension function through a button on the device 102 that causes the vectorial cursor 104 to move further inside the 3D GUI 105 and point to an icon on the desktop 106 above of the application one in FIG. 2C.

FIG. 2A, 2B, 2C are the actual rendering of the device movements and vectorial cursor control as described in FIG. 1. Namely, an up-down tilt of the device will move the cursor in an upward or downward manner. Similarly, a left-right tilt of the device would move the vectorial cursor to the left or the right. Finally, the vectorial cursor would move forward or backward through the depression of a pair of triggers on the device itself that controls its spatial extension and retraction.

Figure 3:
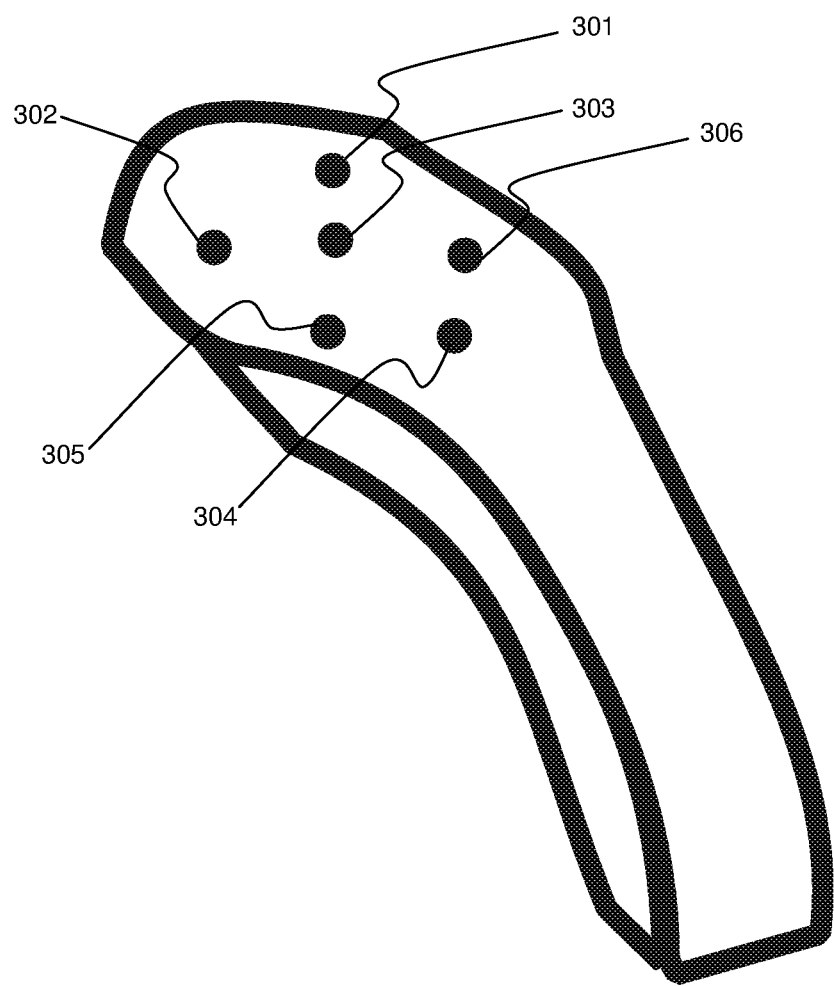
FIG. 3 shows one embodiment of the 3D mouse/controller with the knobs and buttons used for interaction with a 3D environment.

FIG. 3 shows one physical embodiment of the 3D Mouse/Controller with the knobs and buttons used for interaction with a 3D environment. One pair of buttons 301/302 is the equivalent of the left and right clicks of a regular mouse. They activate similar functions. A second pair of buttons (triggers) 303/304 enables the extension and retraction of the vectorial cursor to reach different parts of a 3D environment, by increasing the module of the vectorial cursor. The vectorial cursor being the physical analog of a spherical vector, the buttons actually increase/decrease the module of the vector which is rendered on the screen by a movement of the vectorial cursor forward or backward.

A third pair of buttons 305/306 allows the user to change the field of view or "perspective" of a 3D scene, in order to simulate the Yaw dimension. This is done by graphically changing the field of view through a graphical transformation in the interface software. The action is controlled by another pair of triggers on the device.

Figure 4:
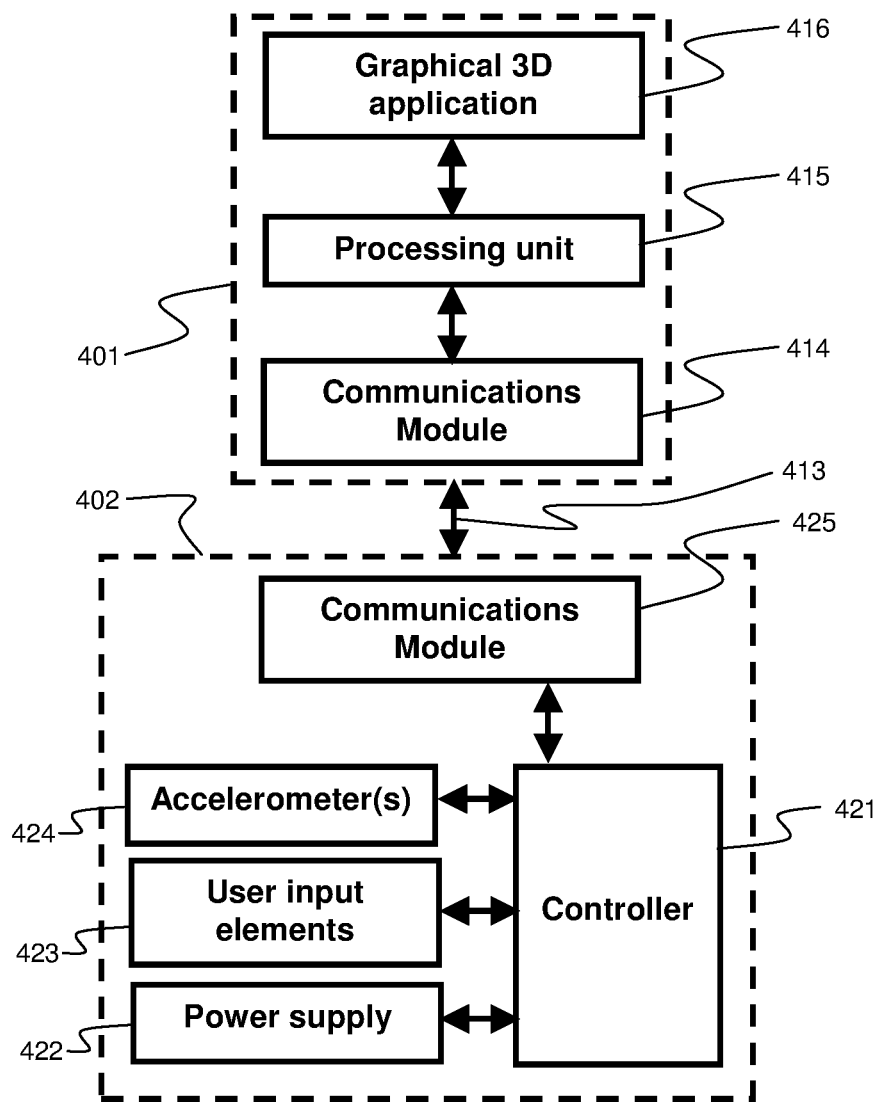
FIG. 4 shows a block diagram of the 3D mouse/controller system and the way it interacts with a 3D application on the computer monitor, through interrelated modules performing the different functions of: movement sensing, sensing data interpretation and conversion to digital data, wireless communication of the data to an interface, graphical rendering of the data in a 3D application.

FIG. 4 shows a block diagram of one embodiment of the 3D Mouse/Controller system. The system comprises an input device (which can also be a hand-held pointing device or a 3D Mouse/Controller) 402 and a display control unit module 401. The input device includes an inertial sensor (accelerometer) 424 operable to detect an acceleration as the user tilts the pointing device in at least one direction; a power supply 422 (which can be a battery, AC power supply, solar cell or any other source of electrical power understood by anyone skilled in the art), a selection unit 423 that comprises a set of user input elements and circuitry to collect the elements activity and allow the user to:

select a command identifier on the display the same way a user would do with the right and left click buttons of a 2D mouse;

control the vectorial cursor location through a pair of triggers that extends the magnitude of the spherical radius R which is the mathematical representation of the vectorial cursor; and control the field of view of a 3D application.

In one embodiment, the hand-held pointing device 402 also includes a controller 421 based around a micro controller and digital signal processor, a field programmable gate array, programmable logic devices, and other related control circuitry well understood by anyone skilled in the art. The controller 421 is connected to the accelerometer 424, the selection unit 423 and the power supply 422. The controller 421 is programmed to receive accelerometer data and to compute tilt angles based on the accelerometer data. The controller 421 is also programmed to receive trigger signals from the selection unit and to compute a vector magnitude and field of view translation in response to the trigger signals. The circuit also manages the battery or other power source 422 and optimizes power consumption for the system. In one embodiment, the hand held pointing device further includes a communications module 425 that converts computed data into communication protocols to be dispatched to a host computer via a wireless (or wired) connection 413.

Further referring to FIG. 4, the display unit control module 401 in one embodiment of the present invention includes a communications module 414 to receive the orientation data and user selection activity data transmitted from the handheld pointing device; and a processing unit 415 comprising a microprocessor, a digital signal processor, memory modules and a driver that interprets communicated data to be viewed by a software interface (graphical 3D application) 416; wherein the software interface gives a graphical rendering of dispatched and interpreted data.

4. Wireless Motion Sensor System Embodiments and Figures

Elements of the embodiments previously described can be incorporated into a wireless motion sensor system. Describing the wireless motion sensor system and method embodiments in greater detail, the instrument (previously described as a 3D input device) could measure performance parameters including but not limited to general activity and motion, speed, acceleration, distance covered, body posture or systems orientation, gait pattern, body or vehicle movement and rotations. The instrument could also detect and measure the frequency of vibrations, falls and impacts and any subsequent variation in performance, posture, orientation, direction and gait patterns after a fall, impact or series of impacts or series of vibrations.

Figure 5:
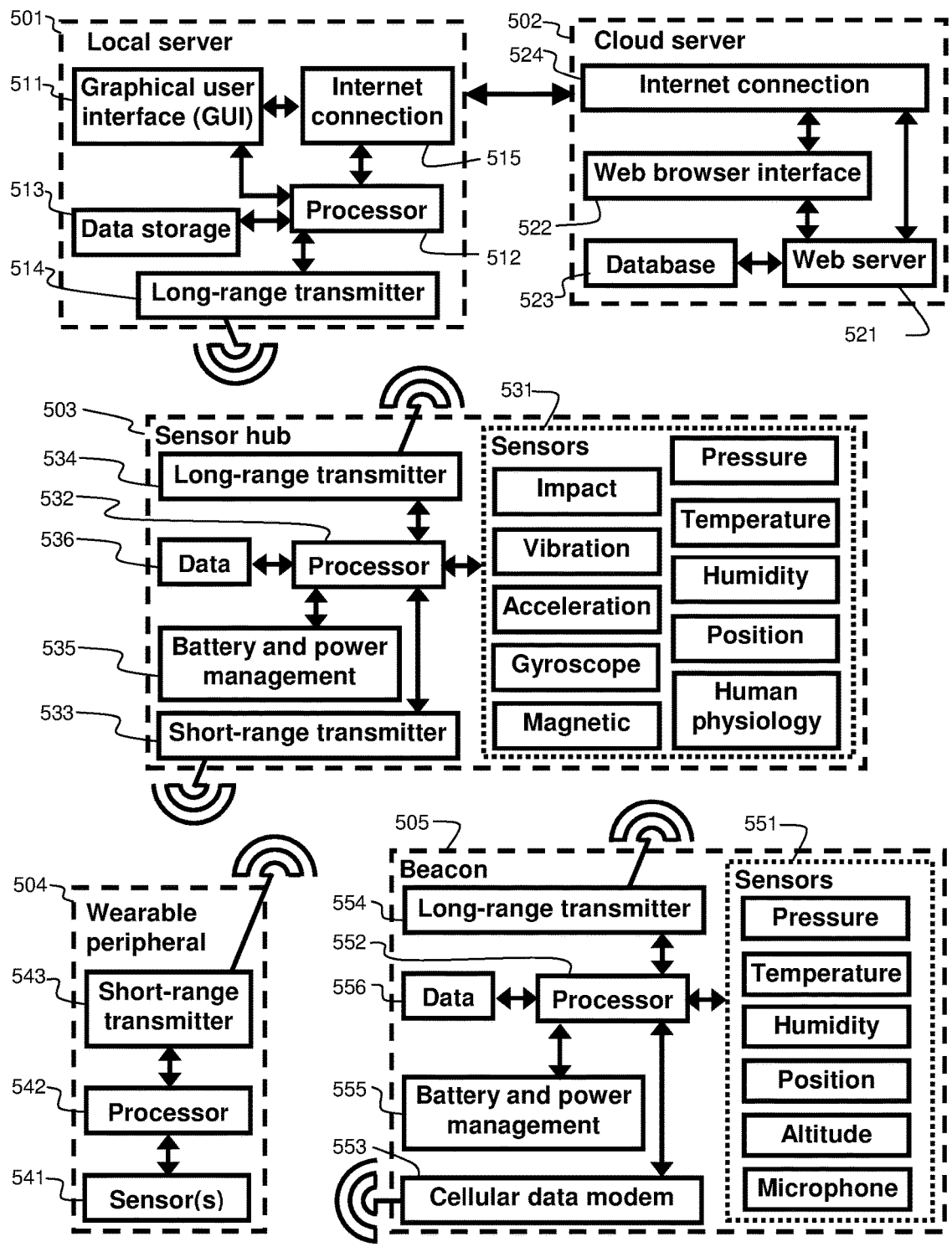
FIG. 5 shows a wireless motion sensor system.

Referring now to the related figures, FIG. 5 gives an overview of the structure and different components of one embodiment of a wireless wearable motion sensing system. The sensing system shown in FIG. 5 can comprise one or more sensor hubs 503, one or more wearable peripherals 504, one or more beacons 505, one or more local servers 501, and one or more cloud servers 502. The sensor hub(s) 503 and the beacon(s) 505 can serve as wireless signal relay units. The sensor hub 503 can comprise a sensor hub processing unit 532, a sensor hub memory unit 536, a long-range transmitter 534, a short-range transmitter 533, battery and power management module, and sensing components 531. The sensor hub can also incorporate wired connectivity for firmware loading and battery charging (not shown). Examples of the sensor hub sensors can include, but are not limited to impact sensor(s), vibration sensor(s), acceleration sensor(s) such as accelerometers, magnetic sensor(s) such as magnetometers, gyroscope(s), pressure sensor(s) such as barometers or altimeters, temperature sensor(s), humidity sensor(s), position sensor(s) such as global positioning system (GPS) modules or triangulation position sensors, and human physiology sensor(s). These sensors can use any sensing technology described in this disclosure or any sensing technology capable of being understood by anyone skilled in the art. For example, the accelerometers can be high g force accelerometers. For purposes of this disclosure and the appended claims high g force accelerometers are accelerometers configured to measure accelerations greater than 16 g (16 times the acceleration of gravity). The human physiology sensors can include (but are not limited to) devices that measure the following human physiologic parameters:

a. Blood chemistry sensors that can measure parameters such as blood alcohol, blood amino acids, blood calcium, blood carbon dioxide, blood catecholomines, blood chlorine, blood cortisol, blood creatinine, blood dehydroepiandrosterone (DHEA), blood electrolyte level, blood glucose, blood hematocrit, blood hemoglobin, blood lactate concentration, blood oxygen saturation, blood PH, blood potassium, blood sodium concentration, and blood uric acid.

b. Blood pressure sensors which can measure parameters such as systolic (maximum) pressure, diastolic (minimum) pressure, and pulse rate. Blood pressure can be measured by a barosensor place on the skin over an artery. The barosensor could be implemented as a MEMS (micro electro mechanical sensor) device or an optical sensor and can measure pressure in the blood vessels. An example of such sensor could be the sapphire optoelectronic blood pressure sensor made by Tarilian Laser Technologies.

c. Body position and orientation can be measured using mechanoreceptors, which could measure mechanical changes in the body using a MEMS sensor such as that used in the HITS (head impact telemetry system) developed at Virginia Tech and Dartmouth College in 2002. Body position can also be measured using a GPS position measurement of a body part, or optical, magnetic, gyroscopic, or acceleration-based sensors. These sensors could be on any body part and could measure relative motion of various body parts to each other.

d. Brain activity can be measured using an electroencephalograph (EEG), which could record the electrical potential along the scalp produced by the neurons within the brain. EEG measurement can be done using any EEG technology capable of being understood by anyone skilled in the art.

e. Eye position and movement can be measured using a video camera that records images of the user's eyes as they move.

f. Eyelid position and movement can be measured using a video camera that records images of the user's eyelids as they move.

g. Other eye parameters can also be measured. One example can be retinal scanners, such as those made by Optos, which scan features of the back of the retina.

h. Heart function, which can include both heart rate and an electrocardiogram (ECG). The pulse can also be referred to as the heart rate, which is the number of times the heart beats each minute (bpm). Heart rate gives a simple measure of heart function that can be measured using a simple electrically conductive sensor that measures electrical signals in the skin or changes in blood pressure to get a pulse. One example of such a sensor can be the Polar Electro hear rate monitor. An electrocardiogram, also called an EKG or ECG, is a simple, painless test that records the heart's electrical activity. An ECG, which could be implemented using any ECG technology capable of being understood by anyone skilled in the art.

i. Respiratory chemistry, such as expired carbon dioxide and expired oxygen, can be measured on the face mask or on the helmet using sensors made by companies such as Philips Respironics or Analox Sensor Technology.

j. Respiratory rate can be measured on the skin surface, or it could be measured on the mask of a helmet. It can also be measured using piezo respiratory sensors or chest and abdominal movement sensing belts, such as those made by Gereonics.

k. Skin parameters, such as touch, vibration, position, and/or sense can be measured with proprioceptive sensors placed on a skin surface, an example of which might be the iSkin sensors developed by Saarland University and Carnegie Mellon University;

l. Galvanic skin response sensors (GSR) can measure characteristics such as stress, anxiety, hydration, and electrodermal activity.

m. Skin temperature can be measured by skin sensors such as those made by Maastricht Instruments. The skin temperature sensor could incorporate a thermistor.

The battery and power management module 535 of the sensor hub 503 can comprise a high endurance rechargeable battery. For example, to optimize operation and usability, and enable long-range communication capability, the sensor hub 503 can incorporate a light and compact rechargeable battery with a minimum endurance of 3 hours and a power management system synchronized with the processor's operation. Except when emergency alerts are generated and the data needs to be instantaneously forwarded to the sideline server, long range communication to transmit the sensing data is only activated according to a pre-set dispatch frequency that dynamically adapts to the battery charge level. Although the sensor hub 503 is technically capable of transmitting data directly to the local server 501 or the cloud server, if needed, the availability of the sideline beacons 505 can optimize data flow and battery endurance. For the same reason, the short-range communication between the wearable peripheral 504 and the sensor hub 503 optimizes the wearable peripheral battery endurance.

The sensor hub long-range transmitter 534 can be configured for communication (transmission and receiving) with the local server long-range transmitter 514 and the beacon long-range transmitter 554. The transmission technologies for the long-range transmitters 534, 514, and 554 can be any wireless transmission technology capable of being understood by anyone skilled in the art, including, but not limited to:

a. Bluetooth, which is a wireless technology standard for exchanging data over distances up to 100 meters. Bluetooth was originally conceived as a wireless alternative to RS-232 data cables. It can connect several devices, overcoming problems of synchronization. It is designed for low-power consumption, with mostly a short range based on low-cost transceiver microchips in each device. Officially, Class 3 radios have a range of up to 1 meter (3 ft), Class 2, most commonly found in mobile devices, 10 meters (33 ft), and Class 1, primarily for industrial use cases, 100 meters (300 ft). In most practical cases, a Class 1 maximum range is 20-30 meters (66-100 feet) and a Class 2 maximum range is 5-10 meters (5-30 feet). Bluetooth uses the 2.4-gigahertz ISM (industrial, scientific, medical) band that is 83 megahertz wide. Bluetooth uses frequency hopping spread spectrum (FHSS) and is allowed to hop between 79 different 1 megahertz wide channels in this band.

b. Zigbee, which is a low-cost, low-power, wireless mesh network standard targeted at the wide development of long battery life devices in wireless control and monitoring applications. Zigbee devices have low latency, which further reduces average current. Zigbee can operate in the 868 megahertz, 915-megahertz, and 2.4-gigahertz bands.

c. WiFi (also written as Wi-Fi), which is a local area wireless computer networking technology that allows electronic devices to connect to the network, mainly using the 2.4-gigahertz (12 cm) UHF (ultra high frequency) and 5-gigahertz (6 cm) SHF (super high frequency) ISM (industrial, scientific, and medical) radio bands. Among the most common current WiFi implementations use the IEEE 802.11a, 802.11b, 802.11g, 802.11n, and 802.11ac standards. The IEEE 802.11ah implementation (White-Fi or Super WiFi) is also highly suitable for longer-range transmission at lower (sub 1-gigahertz) frequencies that have less propagation losses and allow greater distances.

d. Cellular 3G/4G, which is third generation and fourth generation cellular telecommunication technology that provide a data transfer rate of at least 200 kilobits per second. Later 3G releases, often named 3.5G, 3.75G, and 3.9G, provide data transfer rates of greater than 1 megabit/second. 3G cellular supports traditional circuit-switched telephony technologies. 4G cellular uses an all-Internet Protocol (IP) based implementation.

e. Satellite, which is wireless communication that uses electromagnetic waves requiring line-of-sight with a satellite. These communications are therefore obstructed by the curvature of the earth. Communication via satellites can relay a signal around the curve of the earth, allowing communication between widely separated points. Communication between ground and satellites and between two satellites can be done at a large spectrum of wavelengths and frequencies. Globalstar, Iridium, and Thuraya are an example of satellite communications networks that could be used for long-range communication by embodiments of the present invention.

f. Z-Wave, which is a low-power radio frequency communication technology originally designed for home automation optimized for reliable low-latency communication of small data packets with data rates up to 100 kilobit/second. Z-Wave operates at 908.42 MHz in the U.S. and Canada but uses other frequencies in other countries depending on their regulations. The sub-1-gigahertz band used in the US is not subject to interference from WiFi and other wireless technologies in the 2.4-GHz range such as Bluetooth or ZigBee. This nominally 900 MHz band is the same Part 15 unlicensed ISM band spectrum band used for cordless phones. The modulation is Gaussian frequency shift keying (FSK). Available data rates include 9600 bits/second and 40 kilobits/second. Output power is 1 milliwatt or 0 dBm. As with any wireless technology, the range of transmission depends on the environment. In free space conditions, a range of up to 30 meters is possible. The through-wall range is considerably less. Z-Wave is scalable, enabling control of up to 232 devices. The Z-Wave wireless mesh networking technology enables any node to talk to other adjacent nodes directly or indirectly through available relays.

Communication between the sensor hub 503 and the wearable peripheral 504 can be implemented by configuring the sensor hub short-range transmitter 533 for communication (transmission and receiving) with the wearable peripheral short-range transmitter 543. The transmission technologies for the short-range transmitters 533 and 543 can be any wireless transmission technology capable of being understood by anyone skilled in the art, including, but not limited to:

a. Bluetooth Class 2 and Class 3, which are subsets of the Bluetooth protocol, and mostly used with computer peripherals and mobile devices. Bluetooth Class 3 radios have a range of up to 1 meter (3 feet). Bluetooth Class 2 radios have a range of up to 10 meters (30 feet).

b. Near field communications (NFC), which is a set of communication protocols that enable two electronic devices, one of which is usually a portable device such as a smartphone, to establish communication by bringing them within 4 cm (2 in) of each other. NFC employs electromagnetic induction between two loop antennae when NFC devices—for example a smartphone and a "smart poster"—exchange information, operating within the globally available unlicensed radio frequency ISM (industry, science, medicine) band of 13.56 MHz on ISO/IEC 18000-3 air interface at data rates ranging from 106 kilobits/second to 424 kilobits/second.

c. ANT, which is a proprietary (but open access) multicast wireless sensor network that defines a wireless communications protocol stack that enables hardware operating in the 2.4 GHz ISM band to communicate by establishing standard rules for co-existence, data representation, signaling, authentication, and error detection. It is conceptually similar to Bluetooth low energy, but is oriented towards usage with sensors. ANT is primarily incorporated into sports and fitness sensors, though it may additionally be used for other purposes. ANT can be configured to spend long periods in a low-power "sleep" mode (consuming of the order of microamps of current), wake up briefly to communicate (when consumption rises to a peak of 22 milliamps (at −5 dB) during reception and 13.5 milliamps (at −5 dB) during transmission and return to sleep mode. Average current consumption for low message rates is less than 60 microamps on some devices.

d. Z-wave, as described previously.

The wearable peripheral 504 can comprise one or more wearable peripheral sensors 541, a wearable peripheral processing unit 542, data storage memory (not shown), a compact battery (not shown), and the wireless peripheral short-range transmitter 543. The wearable peripheral sensors 541 can be any one or more of the sensors previously described as sensor hub sensors 531. In one embodiment, the dimensions of the peripheral sensing instrument can be smaller that a US quarter (i.e. less than 24.2 millimeters in diameter and less than 1.8 millimeters in thickness. Sensing data generated by the compact wearable peripheral sensing unit 504 can be relayed to the central sensor hub 503 where it is combined with data generated by the central hub sensors 531. The combined data can then be transmitted wirelessly to a local server 501 that could be at a long distance (at least 100 meters, at least 300 meters, at least 1,000 meters) from the sensor hub 503.

The transmission of data between the sensor hub or hubs 503, the wearable peripheral or peripherals 503, the beacon or beacons 505, the local server or servers 501, and/or the cloud server or servers 502 can comprise the use of an internet of things (IoT) mode or protocol. Examples of IoT protocols can be efficient communications protocols for transmitting data. They include, but are not limited to:

a. CoAP (Constrained Application Protocol), which is a lightweight Alternative to the HTTP (hypertext transfer protocol) used for transmitting web pages. CoAP packets are mostly based around bit mapping.

b. MQTT (Message Queue Telemetry Transport) is the IoT protocol of choice for many early adopters of IoT applications. It was created in about 2002 and was designed to conserve both power and memory. It is a message queuing protocol that uses a publish/subscribe methodology to allow multiple clients to post messages and receive updates from a central server.

The IoT protocols can be implemented over any short-range or long-range transmission technology including those describe previously. Some examples of IoT protocols and related (short range and/or long range) transmission technologies can include:

a. Bluetooth Low-Energy (BLE)—or Bluetooth Smart, as it is now branded—which offers a similar range to Bluetooth, but designed for significantly reduced power consumption.

b. ZigBee IP, the protocol used with the ZigBee communication technology described previously.

c. 6LoWPAN (IPv6 over Low Power Wireless Personal Area Networks), a protocol that can allow the transmission on data between devices over a WiFi (or wired) Ethernet network using Ipv6 packets. The Thread protocol can operate on 6LoWPAN.

d. Z-Wave, as described previously.

e. IoT over cellular 3G and 4G networks.

f. IoT over NFC (near field communication).

g. Sigfox is a technology that has a range longer than WiFi and not as long as cellular. Sigfox uses a technology called Ultra Narrow Band (UNB) and is only designed to handle low data-transfer speeds of 10 to 1,000 bits per second. It consumes only 50 microwatts compared to 5000 microwatts for cellular communication, or can deliver a typical stand-by time 20 years with a 2.5 amp hour battery while this is only 0.2 years for cellular.

h. Neul is similar in concept to Sigfox and operating in the sub-1 gigahertz band. Neul uses small slices of the TV white space spectrum to deliver high scalability, high coverage, low power and low-cost wireless networks.

i. LoRaWAN, is similar in some respects to Sigfox and Neul. LoRaWAN targets wide-area network (WAN) applications and is designed to provide low-power WANs (wide area networks) with features specifically needed to support low-cost mobile secure bi-directional communication in IoT, M2M (machine to machine), smart city, and industrial applications.

Referring further to the system shown in FIG. 5, the system can also include one or more beacons, shown at 505. Beacon units 505 can be positioned on the periphery of a playing field. The beacon or beacons 505 can be configured to be a router, position tracking beacon, and/or an environmental sensing hub. If direct communication between the sensor hub 503 and the local server 501 is not available, the beacons 505 can receive data from the sensor hub 503 via one of the long-range protocols discussed previously, from which the data could be forwarded to the local server 501, for potential onward transmission to the cloud server 502. n another network topology, a beacon 505 could receive signals directly from a wearable peripheral 504, if the wearable peripheral short-range transmitter 504 is using the same transmission protocol as the beacon long-range transmitter 554.

In yet another network topology, the cellular data modem 553 that is located in the beacon can move data directly to the cloud server 502 using an internet protocol over the cellular network. This can be useful if the local server 501 is not available. Similarly, the wearable peripheral(s) 504, sensor hub(s) 503, or local server(s) 501 could have cellular data modems that communicate with each other or with the beacon(s) 505. More broadly, such communications between any of these system elements (local server(s) 501, cloud server(s) 502, sensor hub(s) 503, wearable peripheral(s), and beacons(s) 505) could use any of the long-range transmission, short-range transmission, and/or IoT transmission technologies described in this disclosure or any other wireless technologies or protocols capable of being understood by anyone skilled in the art.

Typical beacon sensors 551 can include sensors that measure environmental parameters such as barometric pressure, temperature, humidity, altitude, and position. The beacon or beacons 505 can also help improve the accuracy to which players are tracked when GPS technology is unavailable. The position tracking capability of the beacons could be complemented by the dead reckoning capability of the sensing instruments. The beacon or beacons can also comprise a microphone sensor, and this microphone sensor could be responsive to sounds from the field or sounds from the audience, such as the volume of cheers from the spectators at a sporting event. The beacon or beacons 505 can comprise a beacon battery and power management module 555 with functionality similar to the sensor hub battery and power management module 535 described previously. The beacon or beacons 505 can comprise a beacon memory module 556 with functionality similar to the sensor hub battery and power management module 535 described previously.

In one embodiment, the local server 501 is a laptop computer located on the sidelines of a sporting event in which one or more athletes are outfitted with a sensor hub 503 and one or more wearable peripherals 504, with one or more beacons 505 on the sidelines. Referring now to the local server 501, the server 501 receives data from the wearable peripheral sensors 541, the sensor hub sensors 531, and/or the beacon sensors 551 through the wireless transmission network that has previously been described. In addition to the local server long-range transmitter 514 used for receiving this data, the local server 501 comprises a local server processing unit 512, a local server memory unit 513, a local server graphical user interface 511 and a local server internet connection 515. The local server internet connection 515 can be used to connect the local server 501 to the internet, from which the services of a cloud server 502 or other functionality available "in the cloud" can be accessed.

Figure 6:
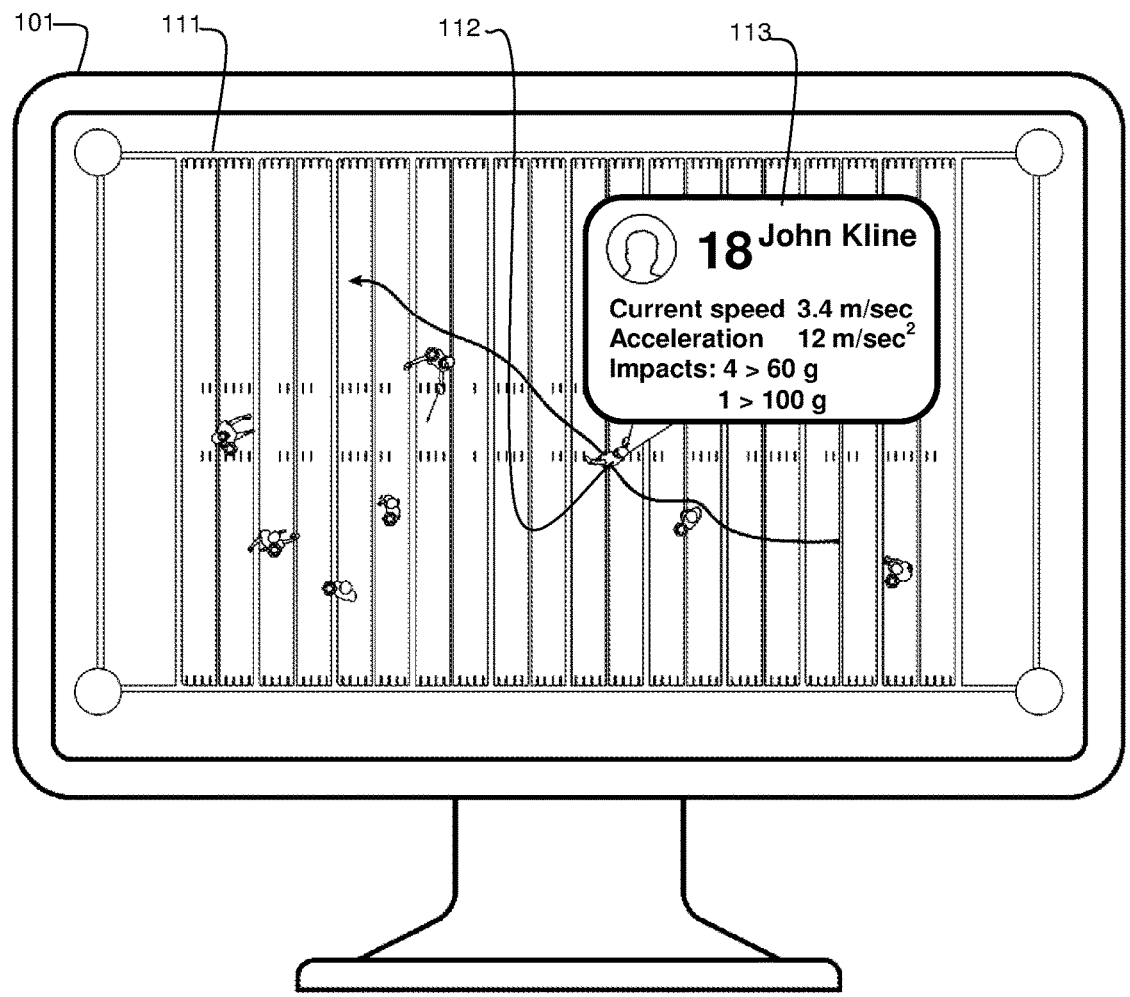
FIG. 6 shows an example of a graphical user interface that can be used as part of the system and method.

The local server graphical user interface 511 can present the data generated by the sensing instruments and processed by the analysis server in graphical format using numbers, graphs, bar charts or pie charts. Referring to FIG. 6, an advanced form of the graphical user interface 110 on a computer monitor 101 could present the data as a superimposed legend 113, over a real-time video feed of the game that includes images of sports players 112. A post-game alternative could present the data via an avatar of the players in a video-gaming environment with the movements and position of the players controlled by the data generated by the sensing instruments and beacons position tracking functions. This could be useful in a realistic implementation of fantasy football environment where the field-generated data would control the fantasy football characters. To add realism, the environmental parameters and crowds cheers could be integrated in the post-game video-gaming re-enactment of the game.

Further referring to FIG. 5, in one embodiment, the cloud server 502 is a server in a "cloud farm" that has been configured to talk to the internet through an internet connection 524. The cloud server 502 further comprises a web server 521 that can access a database 523. The cloud server also includes a web browser interface 522 that and interact with the local server 501 by configuring HTML (hypertext markup language) pages to be sent via the hypertext transfer protocol (http) through the server internet connection 524 to the local server internet connection 515 to be displayed using a graphical user interface 511.

In one embodiment of the present invention, we can use a 9-axis IMU (inertial measurement unit) that can measure three axes of accelerometer rotation input, three axes of accelerometer linear displacement input, three axes of gyroscope rotational input, and three axes of magnetometer measurement of angles relative to the earth's magnetic field. In this particular embodiment, we can use a MEMS IMU component developed by Invensense, the 9250 IMU. Any similar IMU including a combination of individual accelerometers, gyroscopes and magnetometers could be used. The 9250 IMU is a miniature, self-contained, low-power, complete 9-axis IMU with a digital output, all on a single monolithic IC. The 9250 IMU can measure dynamic acceleration (e.g., vibration) and static acceleration (e.g., gravity), angular acceleration and angles with respect to the magnetic pole. For the detection of impacts we can use a high G accelerometer with the capability to measure a maximum acceleration of 400 Gs, can be used. In this particular embodiment, we are using STMicroelectronics' H3LIS331DLTR accelerometer with selective high acceleration ranges of 100 G, 200 G and 400 G.

Low energy Bluetooth technology can be used for communication between the peripheral sensing instrument and the sensors hub. In one embodiment, we can use a Texas Instruments' 'Low Energy Bluetooth IC SOC 2.4 GHZ BLUETOOTH (CC2541F128RHAT) chip with basic microcontroller functionality allowing basic processing functions to take place at the peripheral sensors level, prior to forwarding the generated data to the sensors hub.

Long-range communication between the sensors hub and the beacons or the local server could also rely on Class 1 Bluetooth technology, WiFi technology or any similar technology. In one embodiment, we can use a Microchip SOC 2.4 GHZ BLUETOOTH 40VQFN chip (RN41-I/RM).

An ARM-based microcontroller can be used for low-power high throughput processing. The controller in one embodiment of the present invention is a Texas Instruments model MSP432P401R with 256 KB of flash memory and 64 KB RAM. This controller comes from the Texas Instruments 32-bit MF4ARM Cortex processor family. It is an ultra-low-power, high-performance mixed signals micro-controller. The MSP432P401x family features the ARM Cortex-M4 processor in a wide configuration of device options including a rich set of analog, timing, and communication peripherals, thereby catering to a large number of application scenarios where both efficient data processing and enhanced low-power operation are paramount Power for the peripheral sensing hubs can be provided by a CR2032 coin cell battery. The sensors hub can use a rechargeable LI/Polymer battery such as a 3.7V 120 milli-amp-hour battery from Tenergy. Any compact, high endurance and rechargeable alternative battery could be used for either application.

Figure 7:
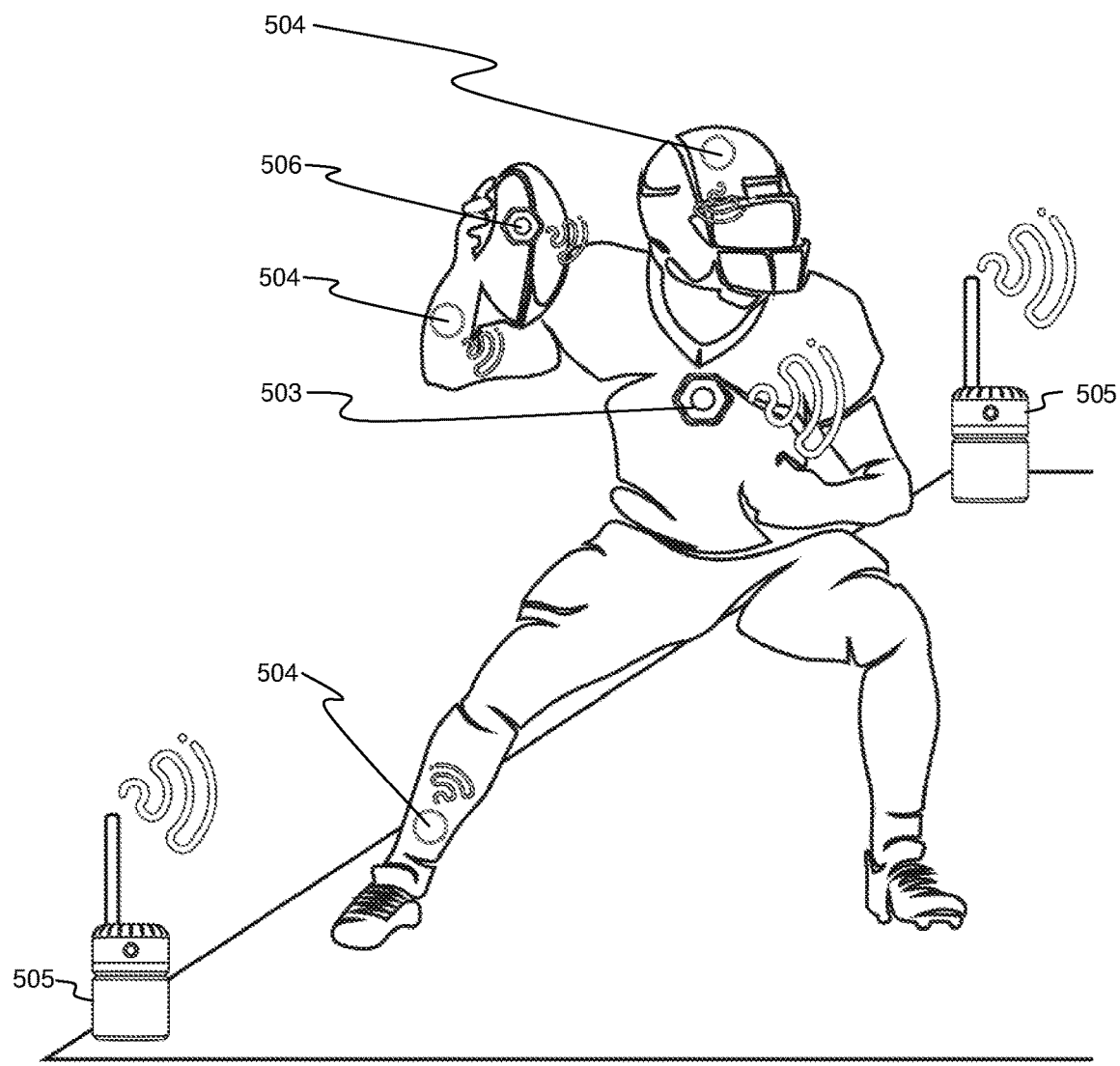
FIG. 7 shows a wireless motion sensor system used in American football.

FIG. 7 shows how the sensor hub 503 and the wearable peripheral 504 that were shown in FIG. 5 can be used in a sports application, such as American football. Referring to FIG. 7 the sensor hub 503 can be worn on the trunk of a football player. The sensor hub 503 can receive data from one or more of the peripheral sensing instruments (i.e. wearable peripherals) 504 on the arm, the leg and the helmet of the player. Data collected by the sensor hub 503 can be transmitted to one or more sideline beacons, shown at 505. The beacon(s) 505 can forward the generated data to the local server (501 in FIG. 5), which can transmit data on to the cloud server (502 in FIG. 5). A sensing unit 506 with similar capability worn sensor hub 504 could also be located inside the football. The data generated by the sensing unit 506 could also be sent to the sideline beacon 505, and be forwarded to the local server 501 in FIG. 5 and/or the cloud server 502 in FIG. 5.

Figure 8:
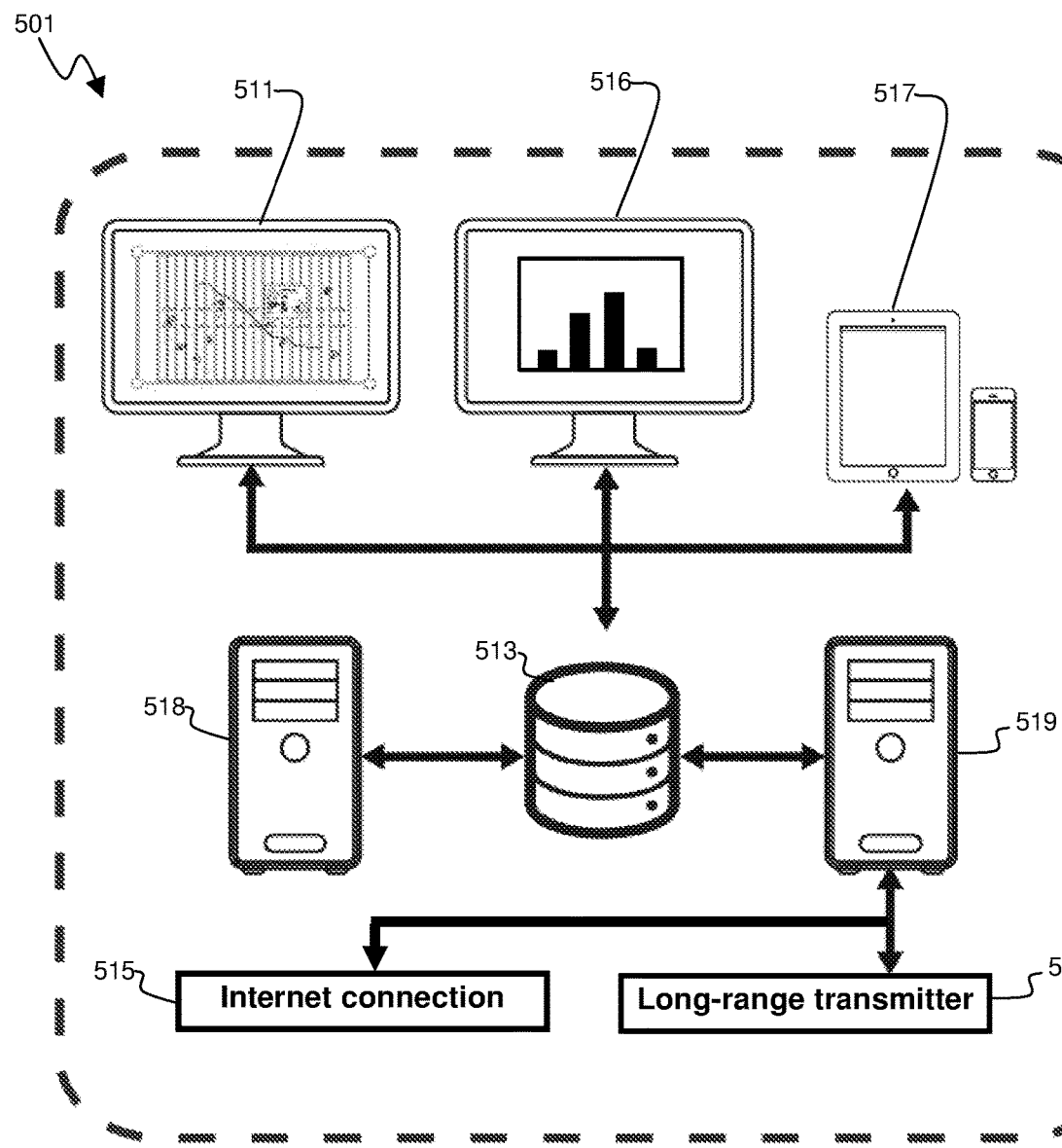
FIG. 8 shows an alternate configuration of the local server that shown as part of FIG. 5.

FIG. 8 shows another embodiment of the local server 501 that was shown in FIG. 5. The local server processor, 512 in FIG. 5, comprises two different functions, a data collection server 519 and a data analysis server 518. Both of these two servers 519 and 518 are connected to a local server database 513 that stores the data generated by the sensor hub(s), 503 in FIG. 5, the wearable peripheral(s), 504 in FIG. 5, and the beacon(s), 505 in FIG. 5. The database 513 is also connected to a reporting module 516 and with the information made available to users through a GUI (graphical user interface) 511.

Referring to FIG. 6, a real-time video stream with the biomechanics/performance parameters overlap can allow the coaching team to have a real-time feedback for the performance and injury level of players. More specifically:

a. The coaching team could view absolute performance parameters such as speeds and accelerations 113. These parameters could be available instantaneously and/or as an average over the game.

b. The coaching team could view performance parameters relative to the player's benchmarks established during training.

c. A graphical rendering of the parameters (bar chart) could be available, which would make the data easier to evaluate.

d. The coaching could view the performance parameters of their players relative to that of the opponents' team allowing them to optimize game tactics.

e. The coaching team could have a real-time view of a team's average performance. This would help optimize game strategies (offensive versus defensive).

f. The coaching team could receive real-time alerts for players sustaining impacts.

g. The accumulation impacts of lower magnitude could trigger alerts.

Embodiments of the present invention could provide post-game information of the team's performance and injury level. More specifically:

a. Post-games, seasonal performance of team could help optimize the drafting process by providing accurate data for needed players with specific performance parameters.

b. Post-game, the overall effect of impacts on team (and individuals) could assist in establishing future player's lineup and game strategies.

c. Post-game average parameters could be compared to benchmark parameters and scoring.

The data collection server can coordinate the reception of data generated by the sensing instruments whether sent directly or through the beacons system. The data collection server can then store the received data in its database and make it available for processing by the analysis server. The analysis server receives the data generated by the peripheral and main sensing units from the data collection server, and runs the different algorithms to generate the impact and performance information that will be presented in the form of tables, graphs or charts in the graphical user interface. The analysis server further combines the data from the sensing instruments with stored data from subjective questionnaire sources and quantitative assessments to generate risk factor information. The generated information can be viewed graphically through the graphical user interface and compiled in the reporting module in spreadsheet format. Examples of the generated information can include, but is not limited to:

a. Impact parameters such as magnitude, location, direction, frequency and induced linear and rotational accelerations;

b. Performance parameters such as averages, accelerations, maximum accelerations, average speeds, maximum speeds, playfield coverage, penetration ratios, scoring ratios, scoring speeds, and scoring accelerations;

c. Risk factors that quantify the likelihood of a player having a mild traumatic brain injury or concussion in subsequent games;

d. Performance indicators that give information about the overall performance level of players as compared to their benchmark performance; and e. Neuromotor parameters (including, but not limited to gait pattern and nystagmus) that give an indication of the coordination ability of a player.

The reporting server compiles impact, performance and risk factor information for individual players on the team and makes it available in a spreadsheet or database format, such as a .csv, a .xls, or an xlxs file format. The reporting server could later run an algorithm with pre-selected benchmarks to generate a risk factor and a performance indicator for the whole team.

A smart device is an electronic device, generally connected to other devices or networks via different protocols such as Bluetooth, NFC, WiFi, 3G, etc., that can operate to some extent interactively and autonomously. Smart devices include a tablet, a smartphone, a smart watch, see-through glasses, or virtual reality goggles. Smart devices can be defined as portable or wearable devices that integrate a processing module and interactive graphical user interface. Smart devices can have short-range communication capability or long-range communication capability as described previously. In one embodiment, smart devices receive data from the local server, the cloud server, and/or directly from the sensing units, if in close proximity. Smart devices can allow a person to view sensing data generated by the sensing units and reporting data generated by the reporting module in real-time.

Figure 9:
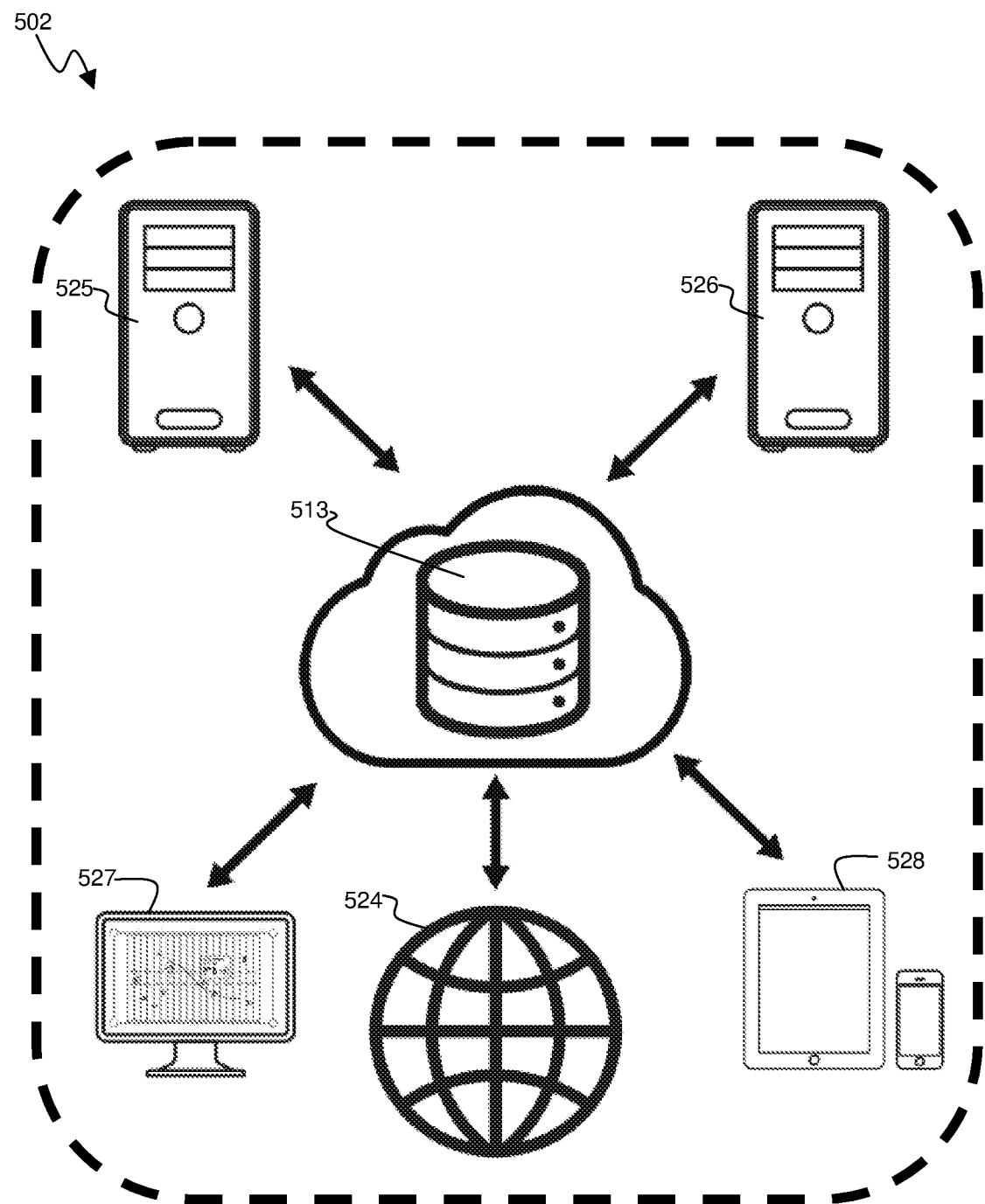
FIG. 9 shows an alternate configuration of the cloud server that shown as part of FIG. 5.

FIG. 9 illustrates more detail about the cloud server (or cloud server) 502 that shown as part of FIG. 5. Referring to FIG. 9, the cloud server 502 receives the data generated by the sensor hub(s), 503 in FIG. 5, the wearable peripheral(s), 504 in FIG. 5, and the beacon(s), 505 in FIG. 5 through the internet connection 524. This data can be stored in the cloud server database (cloud database) 523. The data can be viewed through a graphical user interface (GUI) 527 that could reside on a workstation computer or a laptop. It could also be viewed through smart device interface 528 by a portable device such as a tablet, a smartphone, and/or a wearable device such as a watch, smart glasses, or smart goggles. The web server, 521 in FIG. 5, can perform a variety of functions, including acting as a cloud data collection server, as shown at 526, and an analysis engine, as shown at 525. The cloud database 523 can be used to information generated by the algorithms residing on the analysis engine 525.

The cloud data server receives the information generated by the local server (or servers) of the different teams using the system, stores the data in the cloud database, and performs the needed data management steps in order to make the data available for analysis by the cloud analysis server. In specific circumstances, the cloud data server could receive directly from the beacons or wearable sensors, using IoT communications protocols.

The cloud analysis server compiles the information sent by the different local servers and performs big data predictive analysis using data analysis techniques such as data mining, machine learning, or deep learning. These data analysis techniques can be based on algorithms that attempt to model high-level abstractions in data by using multiple processing layers, with complex structures or otherwise, composed of multiple non-linear transformations. These algorithms seek to make better representations and create models to learn these representations from large-scale unlabeled data. This massive data processing approach can enable "insight extraction" and the acquisition of intelligence related to the correlation of concussions and traumatic brain injury occurrences not only with the parameters of a given impact or series of impacts (magnitude, frequency, location and direction), but also with the specific demographic and physiological profile of the players being affected, as well as the prevailing environmental parameters (temperature, altitude, barometric pressure and humidity) at the time of impact. The end objective will allow the generation of personalized impact thresholds, frequency ranges and risk factors mapped to the various demographic and physiological profiles of players and the different environmental circumstances under which they could play. These personalized parameters would in turn update the databases of the local servers for the different teams, allowing them to have a more precise monitoring of their player's safety.

The overall process of extracting insights from big data can be broken down into the following five stages:
 a. Data acquisition and recording;
 b. Data extraction, cleaning and annotation;
 c. Data integration, aggregation, and representation;
 d. Data modeling and analysis; and
 e. Data interpretation The above five stages form the two main sub-processes. (1) data management, which encompasses the first three stages; and (2) analytics, which encompasses the last two stages. Data management involves processes and supporting technologies to acquire and store data and to prepare and retrieve it for analysis. Analytics, on the other hand, refers to techniques such as the ones mentioned earlier used to analyze and acquire intelligence from the big data sets.

Figure 10:
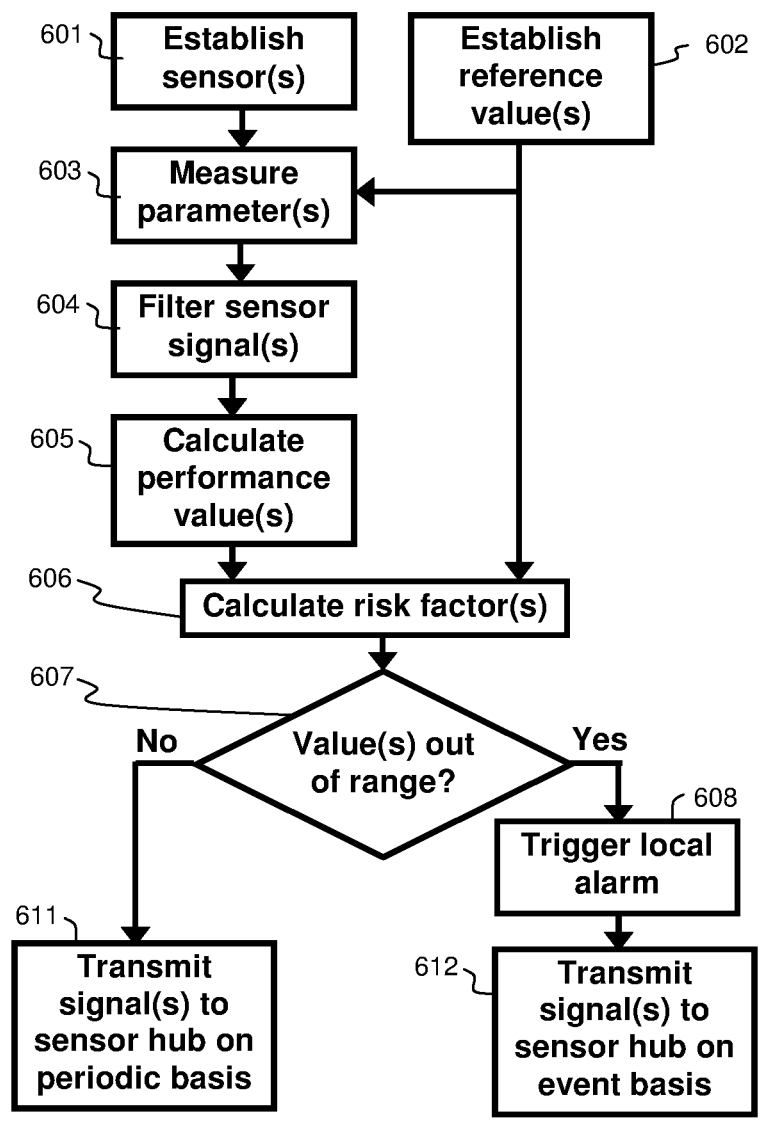
FIG. 10 shows a motion sensing method that can be implemented in the wearable peripheral that was shown in FIG. 5.

FIG. 10 illustrates some of the key steps of the processing that can occur in the wearable peripheral that was shown in FIG. 5. The process begins by establishing a system similar to that which was shown with reference to FIG. 5, including establishing wearable peripheral sensors, step 601, of the type described with reference to FIG. 5. Reference values for the outputs of those sensors should also be established, a step shown at 602. After establishing reference values, the different sensors in the unit measure their respective parameters 603, such as orientation, acceleration, impact, vibration, physiologic, or environmental, etc. Because embodiments of the present invention can use wearable peripherals that can go into a sleep mode to reduce power consumption, and these same embodiments must be able to wake up when receiving a sensor input that is outside the boundaries of a reference value, the system can be configured so that the measured parameters 603 are compared to the reference values 602 on a continuous basis and the measurement of a parameter outside a reference value can trigger the wearable peripheral to wake up, process the data, potentially trigger an alarm 608 and transmit the alarm signal to another device such as the sensor hub 612, before going back to sleep to conserve electrical power.

When the wearable peripheral is awake, the output of the parameter measurement step 603 (i.e. the measured data) is processed by a fusion algorithm 604 (such as a Kalman algorithm, shown in FIG. 15A and FIG. 15B, or a Madgwick algorithm, shown in FIG. 16) to calculate the needed performance values 605, in order to generate risk factor values 606 when compared with reference values. The generated data from the steps describe so far can be stored in the internal memory of the wearable peripheral. If the data falls outside the safety ranges in the step shown at 607, and alarm can be triggered 608 and the data is immediately transmitted to sensor hub 612. If the data is within the safety range, the data can be transmitted according to a pre-established periodical schedule 611, in order to optimize battery endurance. All process steps can be coordinated by a real time clock synchronized with the clock on the main hub and local server.

Figure 11:
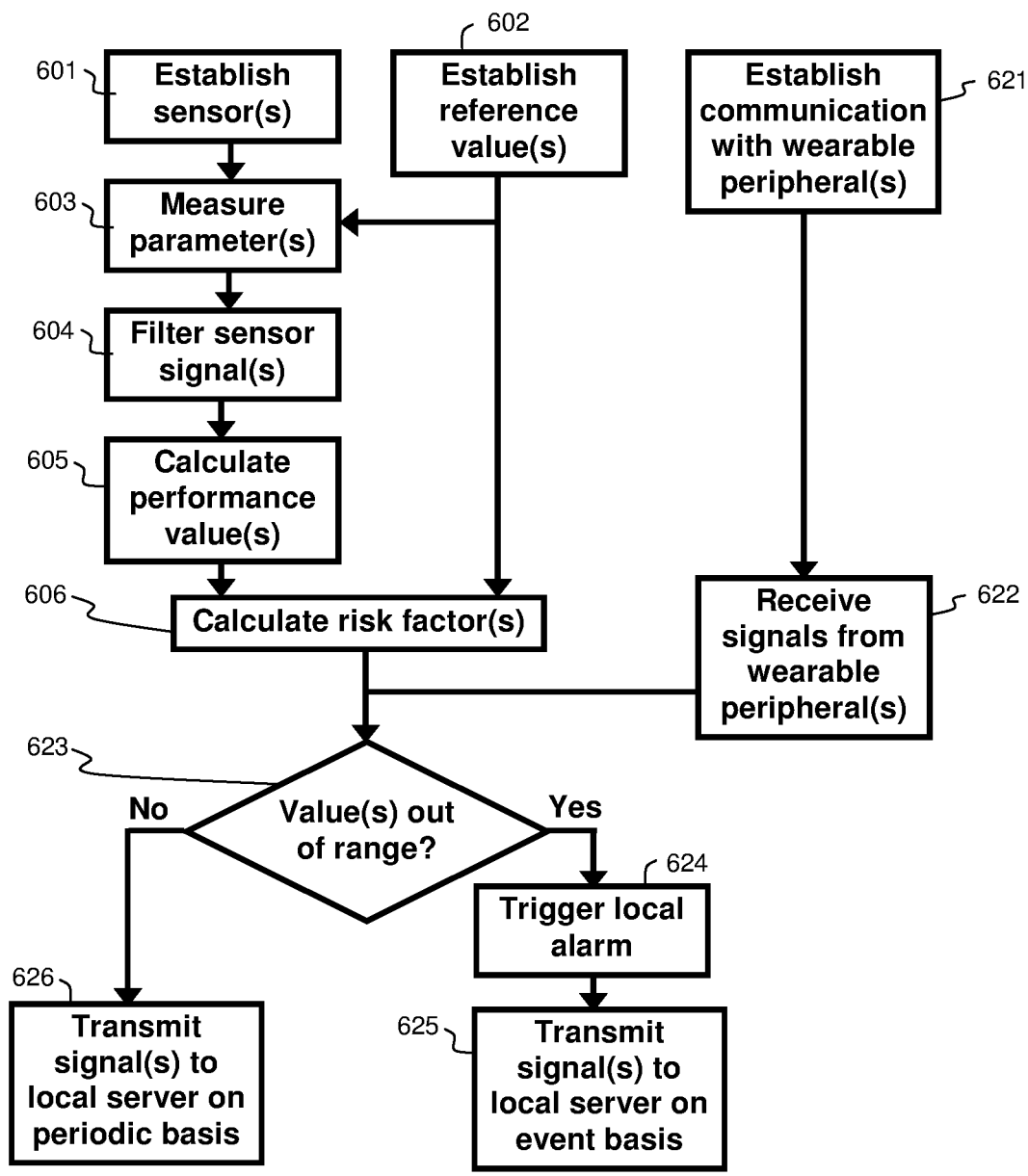
FIG. 11 shows a motion sensing method that can be implemented in the sensor hub that was shown in FIG. 5.

FIG. 11 illustrates the processing that occurs in the sensor hub that was shown in FIG. 5. In comparing FIG. 11 with FIG. 10, one can see that the steps of establishing the sensor(s) 601, establishing reference value(s) 602, measuring the parameter(s) 603, filtering the sensor signal(s) 604, calculating performance value(s) 605, and calculating risk factor(s) are the same for the sensor hub in FIG. 11 as the equivalent steps that were described for the wearable peripheral in FIG. 10. As was described with reference to FIG. 5, a sensor hub can be configured to receive data from one or more wearable peripherals. Thus, FIG. 11 shows that the sensor hub's process can include the step of establishing communication with one or more wearable peripherals 621 and receiving signals from these wearable peripherals 622. Data from the wearable peripheral(s), data from the sensors of the sensor hub, and reference value data, can be stored in the sensor hub's internal memory and analyzed to determine if there are any values out of range, a step shown at 623. If, when comparing this data with pre-established safety ranges, any of the data falls outside the safety ranges, an alarm can be triggered 624 and the data can be instantaneously transmitted 625 to the local server, the cloud server, or a smart device (as described with reference to FIG. 8), when available. If the data is within the safety range, it can be transmitted according to a pre-established periodical schedule 626, to optimize battery endurance. All process steps can be coordinated by a real time clock synchronized with the clock on the main hub and local server.

Figure 12:
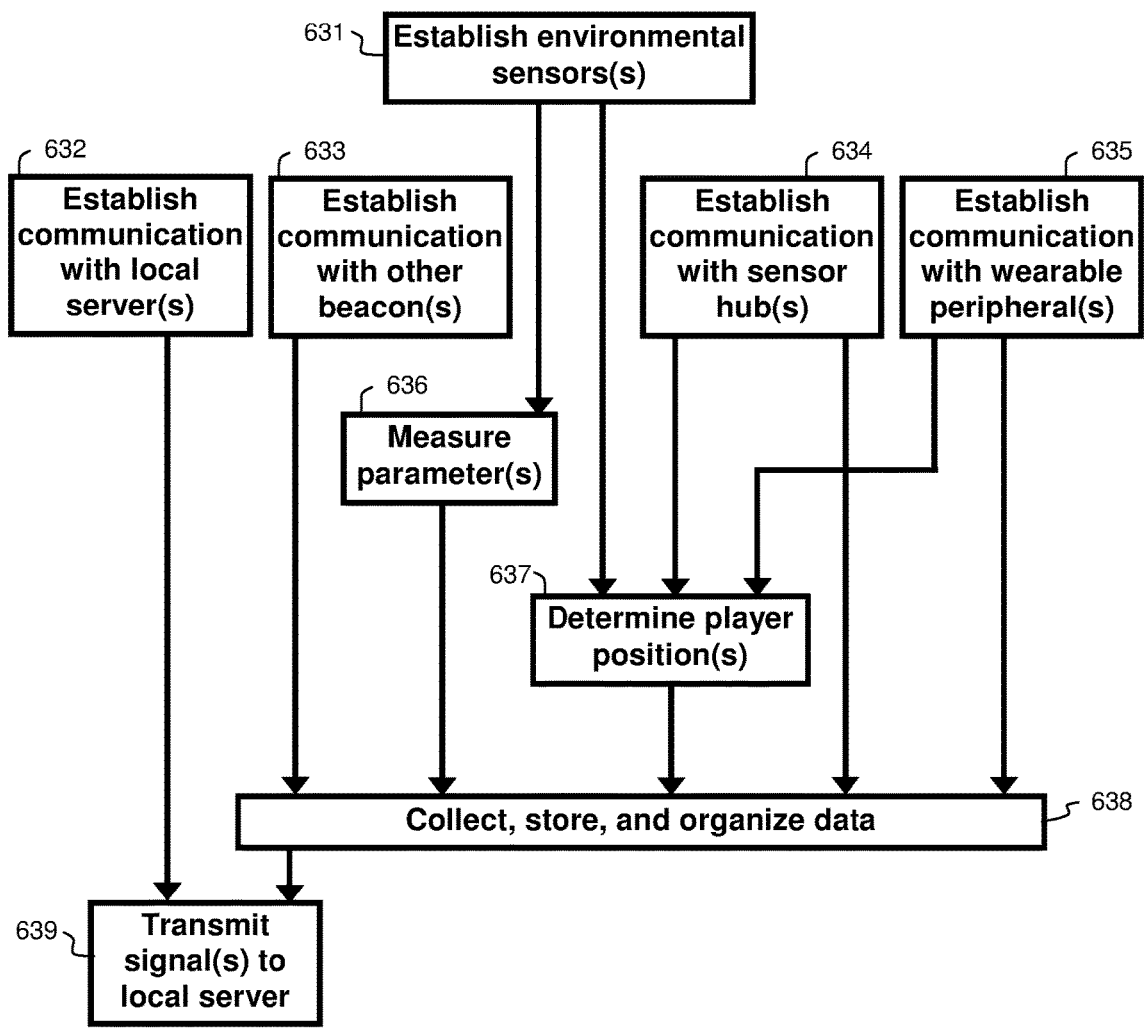
FIG. 12 shows a process that can be used by the beacon of FIG. 5 to perform its role.

FIG. 12 illustrates the processing that occurs in the beacon or beacons shown in FIG. 5. The beacon or beacons can serve as network relays to provide a communication link between the sensor hub or hubs, the local server or servers, and between beacons. In some embodiments, the beacon or beacons can also provide a communication link to one or more wearable peripherals, or to a cloud server of the type described in other parts of this disclosure. Thus, the process steps performed by the beacon or beacons can comprise establishing communication with the local server or servers 632, establishing communication with another beacon or beacons 633, establishing communication with the sensor hub or hubs 634, and establishing communication with the wearable peripheral or peripherals 635. Furthermore, as was shown in FIG. 5, the sensor beacon or beacon's can also comprise environmental sensors. Thus, referring to FIG. 12 processing in the sensor beacon or beacons can comprise the steps of establishing communication with environmental sensor(s) 631, establishing communication with local server(s) 632, establishing communication with other beacons 633, establishing communication with sensor hub(s) 634, and establishing communication with wearable peripheral(s) 635. Once communication has been established with the environmental sensors 631, environmental parameters can be measured 636. These measured environmental parameters can be filtered using the same processes that were described for the wearable peripheral(s) in FIG. 10. Filtered environmental sensor parameters in the beacons can be used to calculate performance values and risk factors in the same way as was described for the wearable peripheral(s) in FIG. 10. As shown in FIG. 10, data from the environmental sensor(s) can be combined with data from the sensor hub(s) and data from the wearable peripheral(s) to determine a player's position 637. Data from other beacon(s), from the environmental sensor(s), from the sensor hub(s), from the wearable peripheral(s), and from the determination of the player's position can be collected, stored, and organized 638. The results from this step can be transmitted to the local server 639.

Figure 13:
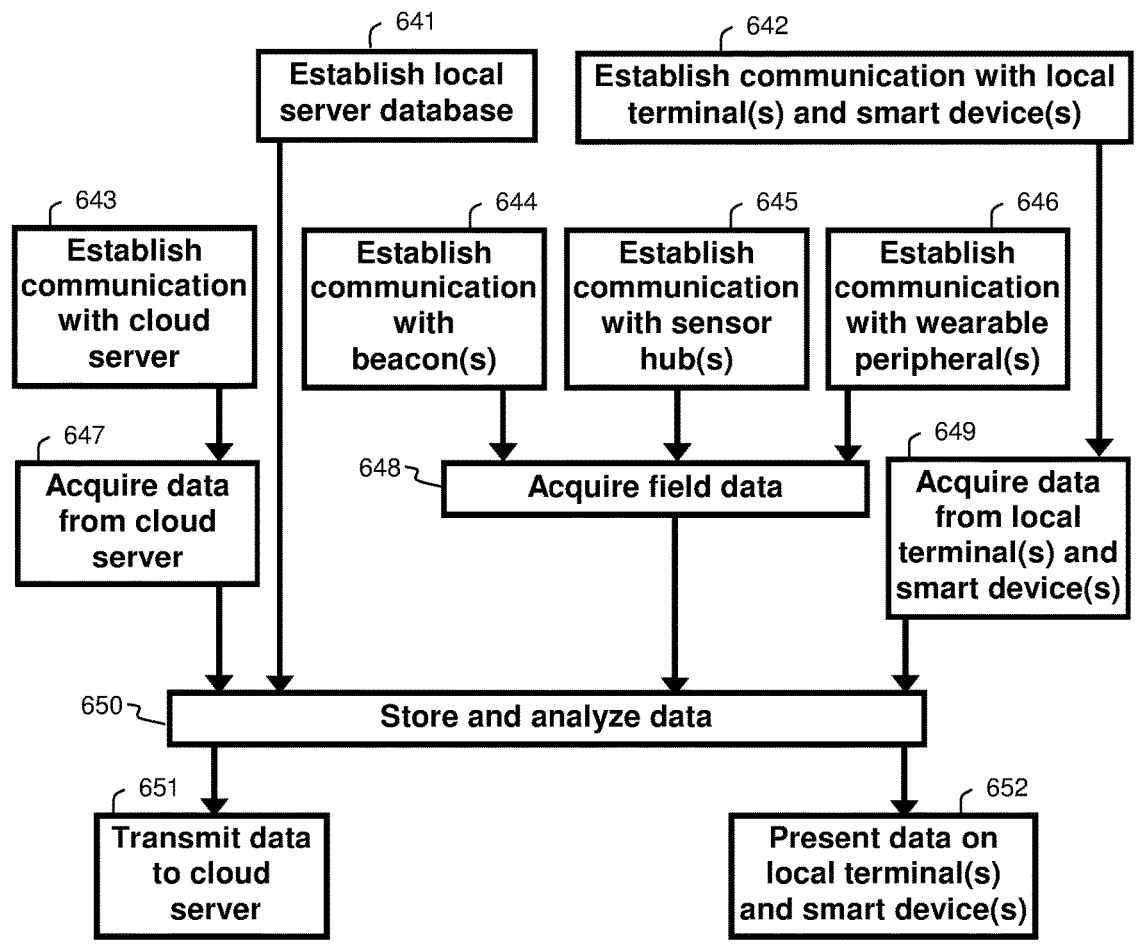
FIG. 13 shows a process that can be used by the local server of FIG. 5 to perform its role.

FIG. 13 illustrates the processing that occurs in the local server or servers shown in FIG. 5. Referring to FIG. 13 the primary functions of the local server can comprise storing and analyzing data 650, transmitting data to the cloud server 651, and presenting data on a local terminal, terminals, smart device, and/or smart devices 652. These primary functions can be accomplished by acquiring data from the cloud server 647 after establishing communication with the cloud server 643, acquiring field data 648 after establishing communication with the beacon(s) 644, the sensor hub(s) 645, and/or the wearable peripheral(s) 46, and acquiring data from local terminal(s) and/or smart device(s) 49 after establishing communication with these terminal(s) and/or devices 642. The local server can establish a local server database 641 to help store and analyze data 650.

Figure 14:
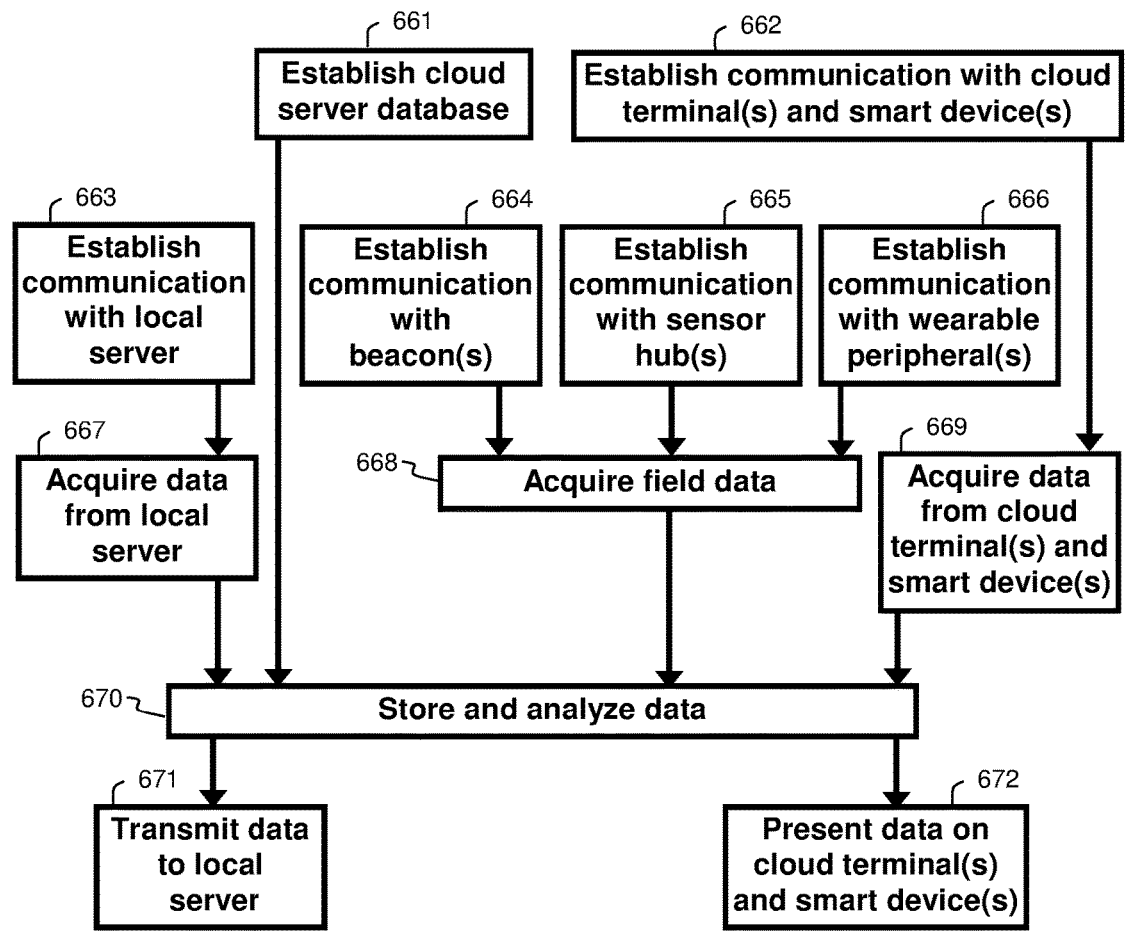
FIG. 14 shows a process that can be used by the cloud server of FIG. 5 to perform its role.

FIG. 14 illustrates the processing that occurs in the cloud server or servers shown in FIG. 5. Referring to FIG. 14 the primary functions of the cloud server can comprise storing and analyzing data 670, transmitting data to the local server 671, and presenting data on a cloud terminal, terminals, smart device, and/or smart devices 672. These primary functions can be accomplished by acquiring data from the local server 667 after establishing communication with the local server 663, acquiring field data 668 after establishing communication with the beacon(s) 664, the sensor hub(s) 665, and/or the wearable peripheral(s) 666, and acquiring data from cloud terminal(s) and/or smart device(s) 669 after establishing communication with these terminal(s) and/or devices 662. The cloud server can establish a cloud server database 661 to help store and analyze data 670.

Figure 15A:
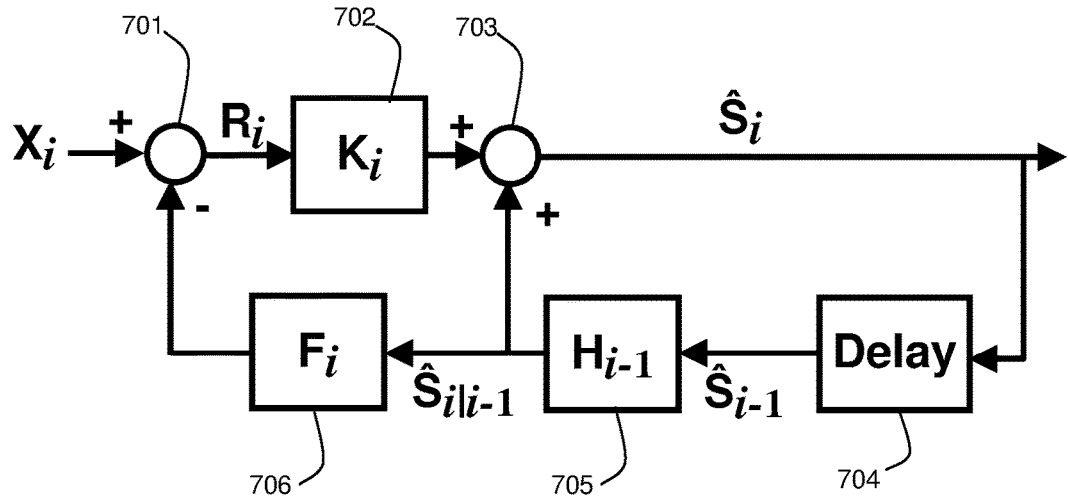
FIG. 15A shows a generalized Kalman filter.

FIG. 15A shows the main elements of a generalized Kalman filter. A Kalman filter is a linear, unbiased, and minimum error variance recursive algorithm that optimally estimates the unknown state of a linear dynamic system from noisy data taken at discrete real-time intervals. Referring to FIG. 15A, the actual measurement Xi is compared with the predicted measurement from the prediction model 706, a step shown at 701. The measured difference between actual measurement Xi and the output from the prediction model 706 is called residual or innovation Ri. This residual Ri is multiplied by a Kalman filter gain in the step labeled 702. Step 702 can comprise a matrix multiplication. In the step labeled 703 the output of the Kalman gain computation is added to the system model output based on the previous estimate, a value shown as $\hat{S}i|i+1$. The result of the addition in step 703 is a new state estimate $\hat{S}i$. The new state estimate $\hat{S}i$ is updated at discrete time intervals based on the length of the time interval delay 704. After this time delay, the most recent state estimate becomes $\hat{S}i-1$, and is called the previous state estimate. The previous state estimate $\hat{S}i-1$ is then fed through a system model 705 which results in a system model output based on the previous state estimate $\hat{S}i|i-1$. This system model transformation 705 can comprise a matrix multiplication. The system model output based on the previous estimate $\hat{S}i|i-1$ serves as the input for a prediction model transformation, shown at 706. The prediction model transformation 706 can also comprise a matrix multiplication. When using a Kalman filter for generating position and orientation information, coordinate transformations performed in the Kalman filter gain calculation 702, the system model transformation 705, and the prediction model transformation 706, can be performed using the Euler angle transformations described previously in the pointer embodiments or through the use of quaternions, as will be described later in this disclosure.

Figure 15B:
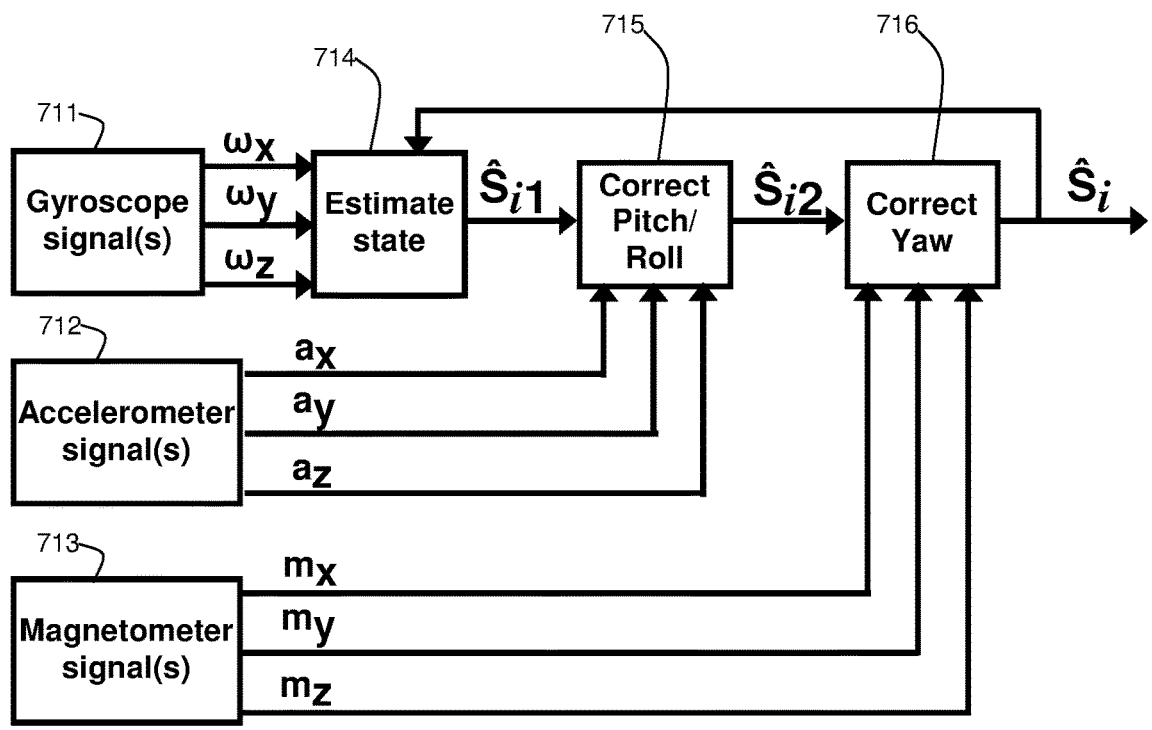
FIG. 15B shows an extended Kalman filter configured for use in an inertial measurement unit.

FIG. 15B shows the main elements of an extended Kalman filter configured for use in an inertial measurement unit (IMU). In FIG. 15B, there are three signals that come from a gyroscope 711 and used to estimate state 714, using a Kalman filter implementation similar to the generalized Kalman filter shown in FIG. 15A. These three signals are labeled ωx, ωy, and ωz in FIG. 15B and represent the rate of change of rotation of the gyroscope about three mutually perpendicular (x, y, and z axes) in a Cartesian reference frame. The result of this first Kalman filter to estimate state 714, is a first state estimate $\hat{S}i1$. This first state estimate $\hat{S}i1$ can be combined with accelerometer orientation signals ax, ay, and az from the accelerometer 712. These three accelerometer orientation signals ax, ay, and az are rotation signals about the same three perpendicular axes as for the gyroscope. Combining ax, ay, and az with Ŝi1 in the second Kalman filter, shown at 715, results in a second state estimate Ŝi2, in which pitch and/or roll have been corrected. This second state estimate Ŝi2 can be combined with magnetometer orientation signals mx, my, and mz from the magnetometer 713. These three magnetometer orientation signals mx, my, and mz are rotation signals about the same three perpendicular axes as for the gyroscope and the accelerometer. Combining mx, my, and mz with Ŝi2 in the third Kalman filter, shown at 716, results in an output state estimate Ŝi, in which yaw has also been corrected. The resulting orientation state estimation can be made significantly more accurate using this extended Kalman filter and three different orientation signal inputs 711, 712, and 713, than a Kalman filter using only one input, as was illustrated in FIG. 15A.

FIG. 16 shows the main elements of a Madgwick filter used for an IMU. Referring to FIG. 16 the Madgwick filter also uses orientation inputs from a gyroscope 711, a magnetometer 713, and an accelerometer 712 to generate the output state estimate Ŝi. The Madgwick filter calculates the orientation output Ŝi by numerically integrating the estimated orientation rates. The orientation output Si is computed based on the rate of change of orientation measured by the gyroscope 711. The magnitude of the gyroscope measurement error is removed in the direction of the estimated error. This estimated error is computed from accelerometer measurements 712 and magnetometer measurements 713 using the equations shown in FIG. 16.

Many Madgwick and Kalman filters use quaternions for coordinate transformations, instead of the Euler angle transformations described earlier in this disclosure. The Euler angle representation is sometimes called a 3-2-1-rotation sequence of yaw (or heading), pitch, and roll. A quaternion is an abstract means for representing a change or reference frames as a four-dimensional vector to describe a three-dimensional change in orientation (or attitude). Although the Euler angle representations of attitude, is quite intuitive as a three-dimensional vector representing a three-dimensional attitude, it suffers from an inherent problem with its attitude representation. There are two attitudes (90 degrees and 270 degrees) where a singularity occurs in which case the yaw and the roll would perform the same operations. This "gimbal lock" issue could be quite problematic in the control of a body when dealing with angles close to the singularity points. A quaternion attitude representation can be used to provide a full description of an orientation without the need for handling the Euler angle singularities computationally. There are several other advantages to using a quaternion attitude representation over Euler angles. One of these advantages is that the use of quaternions is that no trigonometric functions need to be solved, as is the case when using Euler angles. Trigonometric functions are computationally expensive to solve and can slow down the control look. Small angle approximations can be used for orientation changes of less than 5 degrees, but this can create other issues. Quaternions require a single trigonometric calculation only when a non-zero yaw angle is included in the orientations. Otherwise, quaternion calculations are solely algebraic and computationally inexpensive. It is also simpler to smoothly interpolate between two orientations when using quaternions rather than Euler angles. However, converting a quaternion orientation into a usable pitch, roll, and yaw orientation does require an extra algebraic transformation that is not needed when using Euler angles.

Quaternions get around the "gimbal lock" problem by over defining an attitude representation through the addition of an additional degree not included when calculating Euler transformations. Like Euler angles, quaternions are based on Euler's concept that: "A rigid body or coordinate reference frame can be brought from an arbitrary initial orientation to an arbitrary final orientation by a single rigid body rotation through a principal angle Φ about the principal axis; the principal axis is a judicious axis fixed in both initial and final orientation." This principle means that any arbitrary orientation could be represented with just a unit vector and an angle where the unit vector (r) defines the direction of rotation and the angle (74) being the amount of rotation about the direction's axis to reach a final attitude from an initial one. The quaternion approach is based upon this principle and can be derived from the principal axis (r) and principal angle (θ). A quaternion is a 4-dimensional hyper-complex number. The three complex parts, denoted as I, j, and k are interrelated by the following equations:

$$i2=j2=k2=1$$

$$ij=k=ji$$

$$jk=i=kj$$

$$ki=j=ik$$

While different papers on the subject use different ordering of the terms, all quaternions fundamentally represent the same thing. Hence, a quaternion could be used to represent the orientation of a rigid body or coordinate frame in three-dimensional space where an arbitrary rotation of a give frame B relative to a given frame A can be achieved through a rotation (θ) around an axis (r) defined in frame A. We can use Madgwick's representation of the quaternion coordinate transformations in embodiments of the sensor signal filter steps shown in FIG. 9 and FIG. 10. The following equation describes a quaternion-based transformation where $_B^A\hat{q}$ command here is a quaternion representing the coordinate transformation and $_B^A\hat{q}$ is defined by the following equation:

$$_B^A\hat{q} = [q_0 \quad q_1 \quad q_2 \quad q_3] = \left[\cos\frac{\theta}{2} \quad -r_x\sin\frac{\theta}{2} \quad -r_y\sin\frac{\theta}{2} \quad -r_z\sin\frac{\theta}{2}\right]$$

Where:
$q_0$ is the scalar component of the quaternion and $q_1$, $q_2$, and $q_3$ represent the vector components of the quaternion. Note that quaternions can be written as a vector with 4-scalar components ($q_0$, $q_1$, $q_2$, and $q_3$), with components $q_1$, $q_2$, and $q_3$ corresponding to the distance along the quaternion basis vectors of i, j, and k. The $q_0$ component is considered the scalar part of the quaternion and $q_1$, $q_2$, and $q_3$ together form the vector part. Hence, another representation of the quaternion in the complex domain $_B^A\hat{q}=q_0+q_1i+q_2j+q_3k$ r is the axis of rotation in frame A and $r_x$, $r_y$, and $r_z$ are the axis components also the x, y and z axes θ is the angle of rotation around the axis r It is often useful to represent a quaternion rotation with an orthogonal matrix that, when post-multiplied by a column vector representing a point ins pace, results in the point rotated by the quaternion. This orthogonal matrix R is shown in the following equation:

$$_B^AR = \begin{bmatrix} 2q_0^2 - 1 + 2q_1^2 & 2(q_1q_2 + q_0q_3) & 2(q_1q_3 - q_0q_2) \\ 2(q_1q_2 - q_0q_3) & 2q_0^2 - 1 + 2q_2^2 & 2(q_2q_3 + q_0q_1) \\ 2(q_1q_3 + q_0q_2) & 2(q_2q_3 - q_0q_1) & 2q_0^2 - 1 + 2q_3^2 \end{bmatrix}$$

It is also useful to represent the Euler angles as a function of the quaternions. In an Euler angle representation of a transformation the ZYX Euler angles Φ, θ, and ψ, describe the orientation of frame B achieved by the sequential rotations from alignment with frame A, of ψ around the Z axis of Frame B, θ around the Y axis of Frame B, and Φ around the X axis of Frame B. Hence, the Euler angles can be calculated by the following equations using the $q_0$, $q_1$, $q_2$, and $q_3$ components of the $_B^A\hat{q}$ transformation quaternion:

$$\phi = a\tan2(2(q_2q_3 - q_0q_1), 2q_0^2 - 1 + 2q_3^2)$$

$$\theta = -\arctan\left(\frac{2(q_1q_3 + q_0q_2)}{\sqrt{1 - (2q_1q_3 + 2q_0q_2)^2}}\right)$$

$$\psi = a\tan2(2(q_1q_2 - q_0q_3), 2q_0^2 - 1 + 2q_1^2)$$

Figure 17:
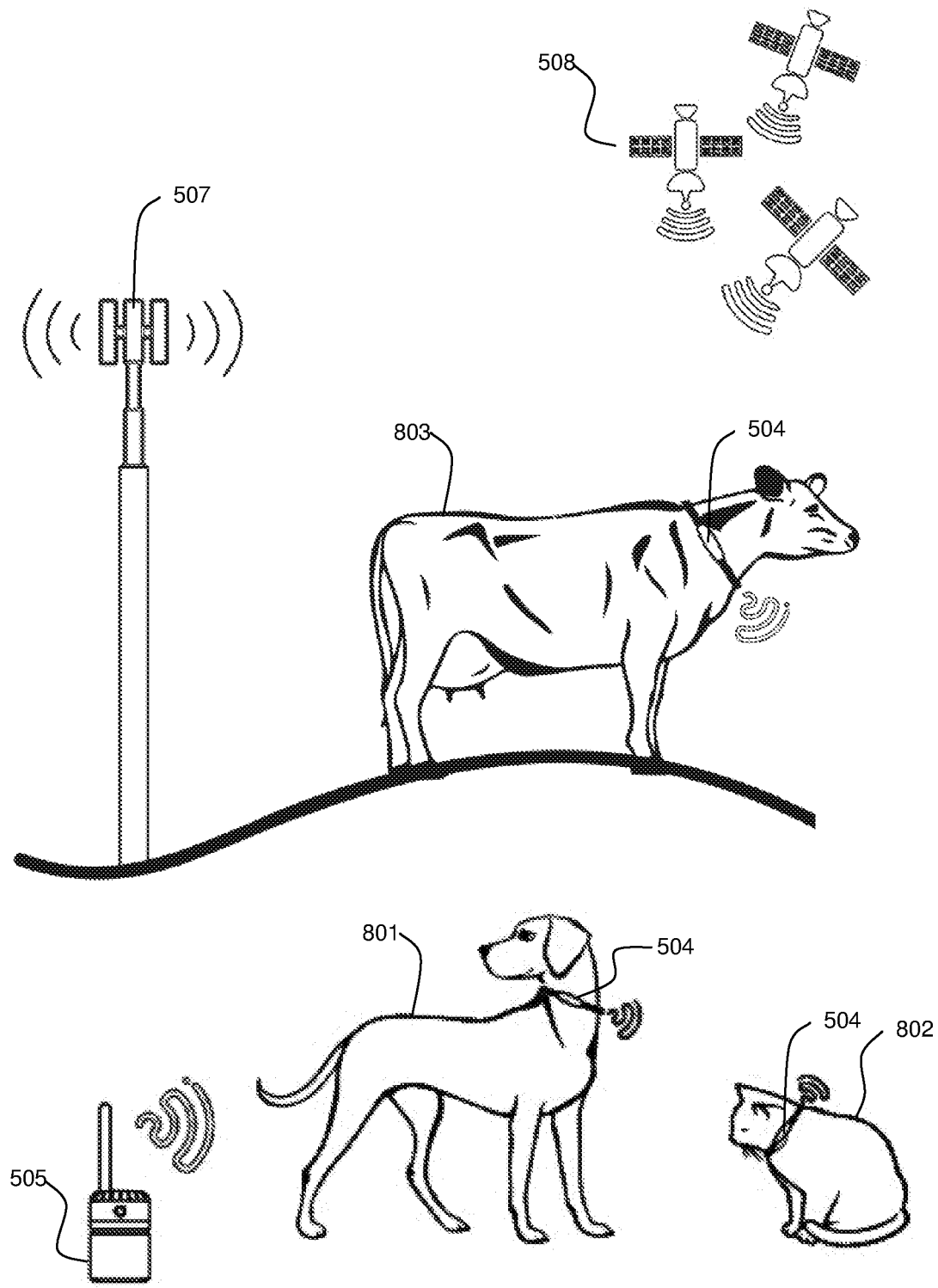
FIG. 17 shows an example of the system being used with animals.

FIG. 17 shows that the wearable peripheral(s) and/or wearable hub(s) can also be worn by domestic pets, such as a dog 801 and a cat 802, as well as large farm animals, such as a cow 803 in a free roaming or contained environment to allow the monitoring of these animals. As with the sports application a sensor hub or hubs and/or a beacon or beacons 505 collect data from one or more wearable peripherals 504 on the same animal. This diagram also illustrates that the wearable peripheral 504 does not necessarily need to be worn by a person. It could also be worn by an animal. The wearable peripheral could also be worn by a device, such as an unmanned vehicle, as will be shown with reference to FIG. 20, FIG. 21, FIG. 22A, FIG. 22B, and FIG. 22C. The data can be communicated to a local server and/or a cloud server using the transmission technologies such as cellular relay 507 and satellite relay 508 communication discussed in other parts of this disclosure. Alternatively, the satellites 508 could be used to provide Global Positioning System (GPS) information to sensors in the wearable peripherals 504 or other parts of the system. Embodiments such as those shown in FIG. 17 can enable the monitoring of animal activity, eating patterns, sleeping patterns, temperature and any abnormal behavior for the real-time detection of any health problem. Temperature monitoring could also be used for precise estrus period detection for a high insemination success rate.

Figure 18:
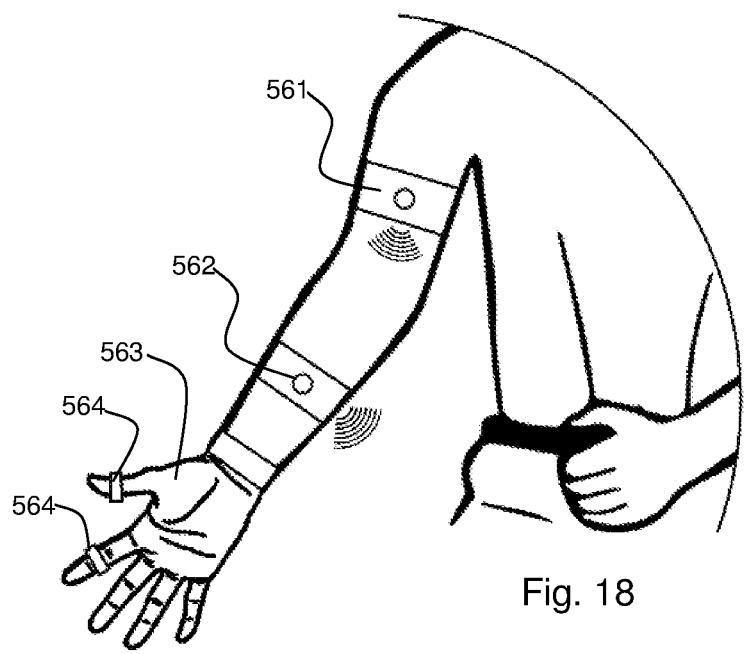
FIG. 18 shows a sensor on a robotic arm.

FIG. 18 shows an application of the system and method for robotics control. More specifically this application allows the remote control of a robotic arm by natural movements of the arm and hand. FIG. 18 shows examples of wearable peripherals including a wearable peripheral smart band 561 and a wearable peripheral smart bracelet 562 on different positions of the arm. The position of the bands with sensors is mapped to the articulated components of the robotic arm. A wearable peripheral smart glove 563 can be combined with wearable peripheral smart rings 564 to control the actual robotic arm extremity. Haptic feedback can be provided through mechanical, piezoelectric, or pneumatic actuators in the glove.

Figure 19:
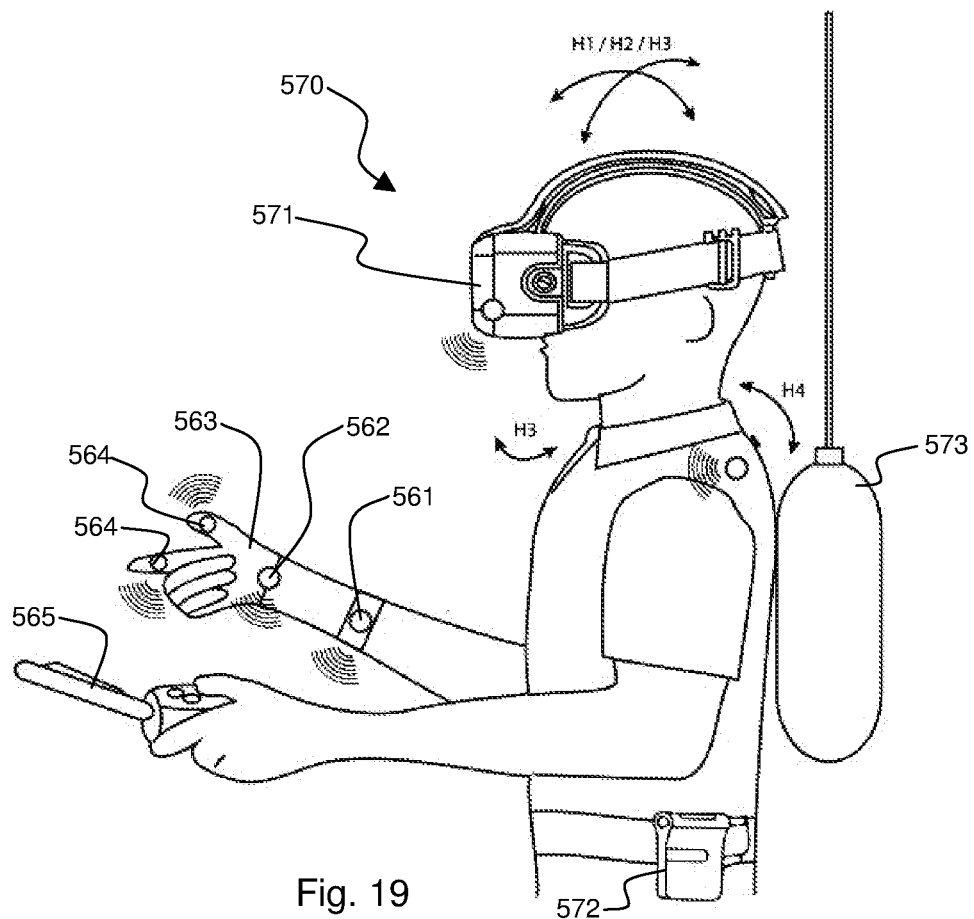
FIG. 19 shows a wearable system.

FIG. 19 shows an application of the system and method for as a wearable control station for Robotics control including unmanned systems such as unmanned aerial vehicles (UAVs), unmanned ground vehicles (UGVs), and remotely operated vehicles (ROVs), such as those that will be shown in FIG. 20, FIG. 21, FIG. 22A, and FIG. 22B. Looking at FIG. 19 in combination with FIG. 20 and FIG. 21, the operator 570 controls a multi-axis manipulator 580 or a robotics vehicle (unmanned ground vehicle) 590 through a motion-sensing controller similar to a game controller. The operator 570 can control a robot arm on the multi-axis manipulator 580 or a robotics vehicle 590 by using a smart glove 563, smart rings 564, smart bracelet 562, and/or smart band 61, alone or together. Visual feedback can be provided through the virtual reality goggles 571 or see-through glasses that could receive video feed from the robot's camera and from a camera on the robot's arm or on the arm of the multi-axis manipulator. The operator's head could be enabled with motion-sensing controller that allows the operator to control the movements of the robot's camera or the unmanned system's camera payload. The system's operation and communication can be controlled by a wearable computer 572 powered by a backpack battery. The system's communications capability is enabled by a wearable backpack long-range communications system 573.

Figure 20:
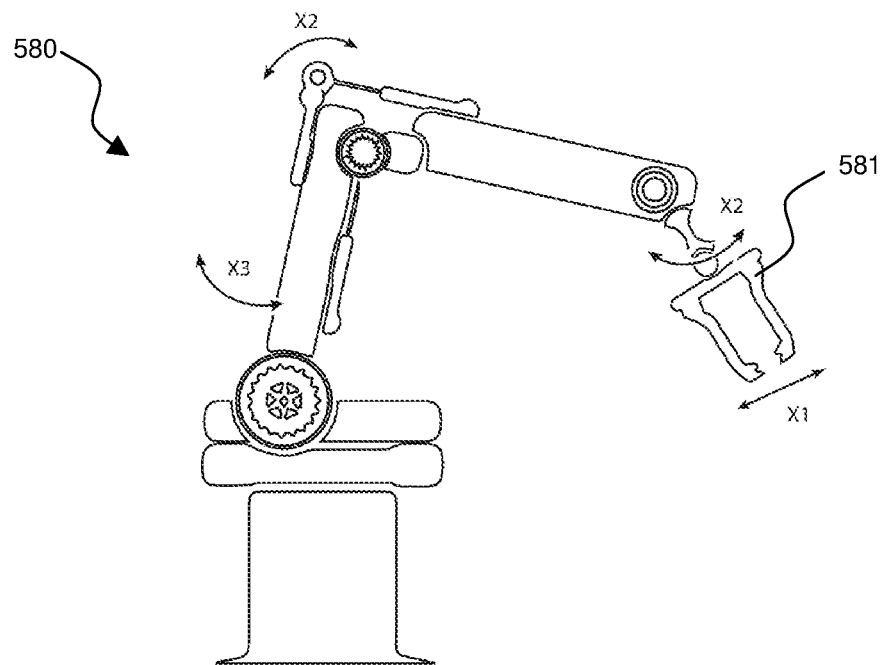
FIG. 20 shows a multi-axis remote manipulator that could be controlled by the wearable system of FIG. 19.

Further referring to the multi-axis remote manipulator (multi-axis robotic arm) 580 of FIG. 20 in conjunction with FIG. 19, the wearable smart glove 563 and wearable smart rings 564 can allow a natural control of the arm holding extremity (claw) 581, by controlling X1 and X2. The armband 561 and bracelet 562 could allow the operator to control the remaining articulations of the arm by controlling the rotations of X3 and X4.

Figure 21:
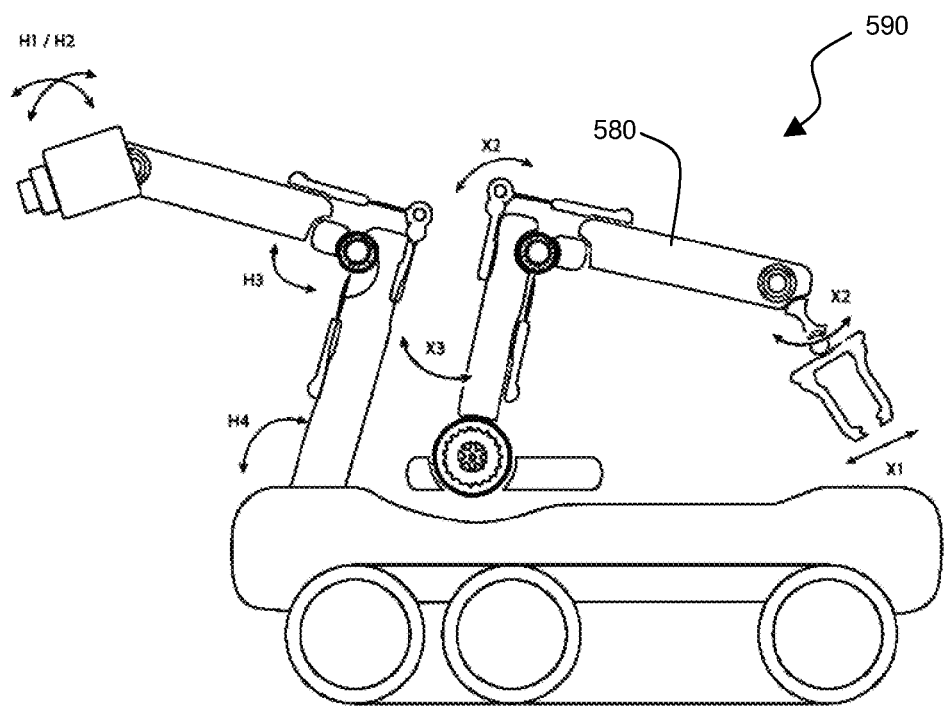
FIG. 21 shows an unmanned vehicle that could be controlled by the wearable system of FIG. 19.

Further referring to the unmanned ground vehicle 590 of FIG. 21 in conjunction with FIG. 19, the unmanned ground vehicle (UGV) 590 could be controlled by the operator 570 using a wearable ground station and associated wearable smart glove 563, wearable smart rings 564, wearable smart band 561, and/or wearable smart bracelet 562, singly or in combination. For example, the operator 570 could control the movements of the vehicle 590 in a natural way by moving a 3D motion-sensing controller 565 like a steering wheel. Visual feedback beyond line-of-sight or in crowded/hazardous environment can be provided through virtual reality goggles 571 with video feed from the main camera. The operator's head and trunk movements control the direction and inclination of the vehicles main camera (H1, H2, H3 H4). The operator wearing a smart glove 563, smart rings 564, and/or smart bands, 561 and/or 562, can control the robotic arm 580 in FIG. 21, of the vehicle 590 with natural movements of the operator's arm, wrist and fingers. Visual feedback is provided through the virtual reality goggles 571 from a camera on the robotic arm 580.

Figure 22A:
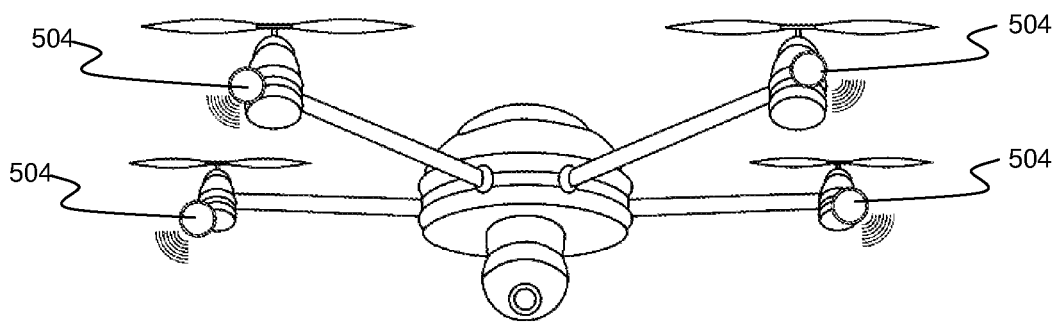
FIG. 22A shows an unmanned aerial quadcopter.
Figure 22B:
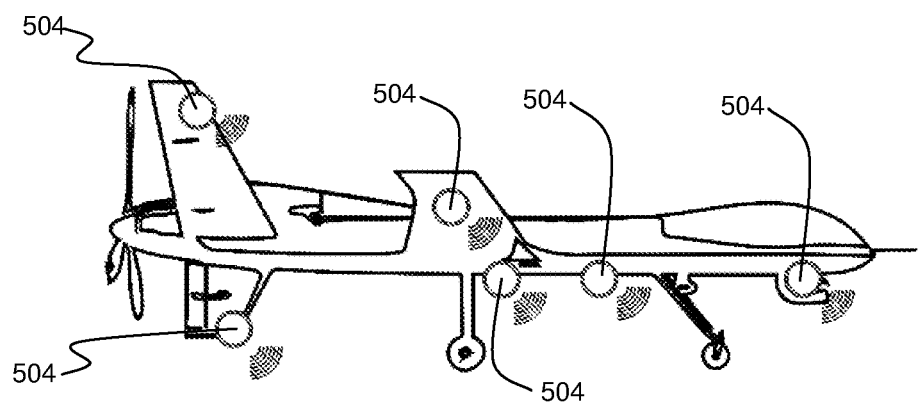
FIG. 22B shows an unmanned airplane.

FIG. 22A illustrates an unmanned aerial quadcopter and FIG. 22B illustrates an unmanned airplane. In the applications shown in FIG. 22A and FIG. 22B, a matrix of "wearable peripherals 504 are affixed on or embedded into the different components of the UAV (unmanned aerial vehicle) airframe. These sensing instruments can send generated data to one or more sensing hubs or beacons also residing in the aircraft that are enabled with long-range communications capability to act as relays. This relay or relays can communicate the sensed data to a local server or a cloud server that could be airborne in another aircraft or ground based. The local or cloud server can stores the data in a database and can generate the required analysis on any of the parameters described in other parts of this disclosure and parameters related to the accurate operation, performance and structural integrity of the aircraft. One of the main sensing instruments could be part of the navigation control system of the UAV and would further provide directional and positional information to the navigation and control CPU.

Figure 22C:
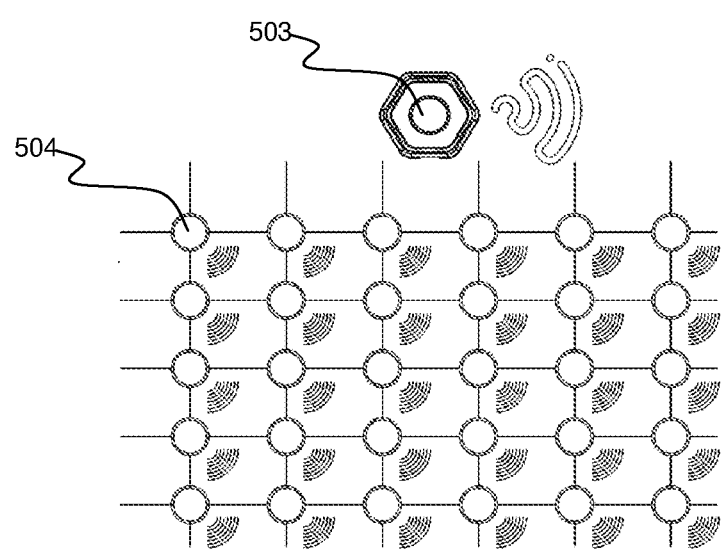
FIG. 22C shows a matrix of sensing components.

FIG. 22C illustrates a more conceptual view of the matrix of sensing components (i.e. wearable peripherals) 504 that were shown in FIG. 22A and FIG. 22B. This shows a matrix of "wearable" peripheral sensing instruments 504 and a sensor hub 503 integrated together. The matrix of sensing components 504 could comprise accelerometers, gyroscopes, and magnetometers, the number and geometrical position of which is optimized for increased accuracy and operational redundancy. This specific embodiment of the sensing instruments 503 could increase their overall accuracy making them more useful in application such as dead reckoning when GPS signal is unavailable and increasing operational availability, if subject to electromagnetic interferences.

Applications for the System and Method Disclosed Herein

The wireless motion sensor system or method could be used in sports, health care, veterinary sciences, industry, and the military. The system or method can sense position, motion, gestures, acceleration, impact, and/or vibration. The sensed data can be quantified and used in performance analysis and monitoring in sports, as well as health related applications including but not limited to daily activity, posture, gait patterns assessment and sleep pattern monitoring, fall detection, rehabilitation, or motion imbalance evaluation including falls.

The system or method could be used with humans, pets, large animals such as horses, cattle or flying species (birds of prey, sea birds) or marine animals and mammals including but not limited to whales, dolphins, turtles, sharks, etc. The system or method could also be used with mechanical systems including but not limited to aeronautical systems such as planes, space shuttles and space exploration vehicles, or unmanned systems (satellites, unmanned aerial vehicles (UAVs), unmanned combat aerial vehicles, unmanned ground vehicles, remotely operated vehicles, industrial robots, explosive ordinance disposal robots, nuclear maintenance robots, automotive vehicles, armored vehicles, tanks, submersible vehicles, and amphibious vehicles.

Referring now to one specific application, the system or method could be used in team sports for the continuous monitoring of athletes' performance parameters (speed, acceleration, scoring), activity and position. Detection of head impacts parameters including (magnitude, frequency, direction, location and the generated linear and rotational accelerations can also be enabled. Additional sensor data that can be monitored can include performance and gait pattern variation, sleep patterns, eating patterns, and/or patterns of daily activity, following an impact over pre-defined concussive thresholds or an accumulation of impacts below pre-defined concussive thresholds.

Referring to a second specific application, the sensor data can also be used to trigger haptic information to a remote device. The remote device could be a chair. The remote device could be a wearable device such as a vest, a glove, a helmet, a headband, an armband, a pad, a cushion, or any other wearable device capable of being understood by anyone skilled in the art. The haptic information could include forces, impacts, mechanical resistances, and vibrations. When used in this configuration, the remote device could partially replicate sports field activity including impacts and performance records, for a better sports fan experience.

Referring to a third specific application, the sensor data could be used to detect normal and/or abnormal activity. For example, the system could be used for the monitoring of daily activity in senior citizens including the detection of activity level variations; gait patterns variations, sleep pattern variations as well as the detection of falls. Pre-set thresholds could generate alert signals that are communicated to a remote device for emergencies. The same construct could be used to detect abnormal posture with office workers or athletes, and send the appropriate alert and posture suggestion. Abnormal activity in a consumer, commercial or industrial and military settings could also be monitored. One such application relates to an object with an integrated sensing instrument that would send an alarm signal if displaced, handled roughly or tampered with. Such an object could be a container with high value or strategic content or an electronic lock securing boxes, containers, truck or any similar cargo. This application could also extend to automotive applications where an embedded sensing instrument would detect high speed and reckless driving in personal or commercial vehicles such as delivery fleets or rental cars, in order to generate the needed alert to parents, fleet operators or insurers. The sensing instrument could be coupled with GPS technology.

Referring to a fourth specific application, the instrument could be worn by an animal. For example, the system could be used for the monitoring of pets or large animals. Items to be monitored could include temperature and daily activity and variation thereof, as well as the variation of gait patterns, sleeping and eating patterns, for the detection of a possible health problem. Position tracking would also allow to find a lost pet/animal and the analysis of grouping and location patterns on a geographical area for optimal herding operations.

Referring to a fifth specific application, the system or method could be used in industrial or military settings for advanced situational awareness with unmanned systems or preventive maintenance with mechanical equipment. Such an application involves the detection of abnormal vibrations or movements in mechanical, hydraulic or pneumatic systems with the possibility of providing haptic information to the remote device, which could be a handheld or wearable remove device. Applications include but are not limited to vibration monitoring in operating machinery or the monitoring of a UAV behavior during flight with haptic feedback relayed to a mechanical system that would render the actual behavior of the UAV, for realistic operation in different weather and theater situations.

Referring to a sixth specific application, the system or method could be used in a commercial setting to prevent the theft of trucks and trailers with a tamper-proof system. Such an application would require the use of one or more peripheral sensing instrument with GPS positioning, motion, vibration and tilt sensing, as well as cellular modem connectivity and short range transmission. A main hub sensing instrument is connected to the peripheral sensing instruments through the short range communication. It further integrates a GPS module, a motion sensor, a rechargeable battery and long range communication in the form of a satellite modem or long range RF signal. When a Cellular signal is unavailable or the peripheral unit unable to operate or is physically disassociated from the vehicle, a short range signal from the peripheral sensing unit triggers the start-up and operation of the main hub and its long range transmission capability to transmit the vehicles GPS coordinates. To optimize battery endurance, the main hub unit could be programmed to send GPS coordinate information when the vehicle approaches pre-set latitude or is idle for a pre-set length of time.

Referring to a seventh specific application, the system comprising the instrument sensing unit, communications capability and remote viewing and storage capability could be integrated in a negative feedback loop with physiological data capture in the instrument including but not limited to temperature, heart rate, blood oxygen saturation, electroencephalograph, and/or vestibular ocular reflex (VOR) being connected to a brain stimulation technology for advanced training. As an example, the wearable unit would measure the performance of athletes in training and map it to various physiological states and brain patterns. The best performance in training would be mapped to the corresponding body posture data, physiological data, brain wave, and VOR data, to replicate the patterns during actual competition using mental suggestion, auto-hypnosis biofeedback techniques or the aid of brain stimulation device. The brain stimulation device could use cranial electrotherapy stimulation, transcranial direct-current stimulation and/or similar brain entrainment technologies.

Referring to an eighth specific application, the system and method could be used for horse racing and/or dairy operation optimization. The system or method could be used with any large animals including but not limited to cattle, horses and camels, to improve their racing performance or feeding habits. For example, the best time for a racing horse would be mapped to the physiological data and brain wave patterns in order to be replicated during the race using different brain stimulation techniques. Dairy animals feeding and reproduction patterns could also be mapped to their brain wave patterns, physiological data and other environmental data such as ambient temperature and light, for an optimization of feeding habits in view of optimal milk and meat production and/or reproduction schedule.

Referring to an ninth specific application, the system and method could be used by the military Special Forces for stealth insertion behind enemy lines, situation awareness and position tracking of the unit and each element therein without radio communications and/or location in case of capture Referring to a tenth specific application, the instrument in the system and method can use MEMS (micro electro mechanical system) sensors to detect and quantify impacts. The magnitude of these impacts can be mapped to pre-established thresholds that have been shown to cause concussions. This system and method could be used to measure the number and severity of impacts that are above a generally recognized concussive threshold. The system or method could also be used to measure the cumulative effect of multiple sub-concussive impacts. In one embodiment, the system and method described herein can augment impact magnitude and frequency measurement with measurements of induced rotational and linear accelerations that affect the cranial cavity. These induced accelerations are often generated by tangential impacts and would generate internal trauma inside the brain that is hard to detect even with the use of standard medical imaging equipment. To increase the level of certainty as to the presence of a concussion, embodiments of the present invention can continuously monitor performance and activity parameters such as speed, acceleration, total distance covered and field coverage and their variation as well biomechanical and neuromotor indicators including but not limited to gait pattern variation, post-impact. The data generated by the different embodiments of the present invention could be augmented with measurements generated by other existing applications and inventions being developed in the field, such as subjective questionnaires or objective measurements of nystagmus, in order to increase the confidence level as to the presence of a concussion, prior to undertaking expensive medical imaging procedures. Embodiments of the present invention can further be capable of developing personal assessments of concussion risk based on a player's physiological attributes (such as age, gender, height, weight) and previous impact history, as well as environmental parameters (temperature, humidity, altitude or barometric pressure) through big data analysis and self-evolving algorithms based on history. Another embodiment of the present invention could be used off-field to track the activity and sleep patterns of players to assess post-impact symptoms duration for a quick and safe return to play approach. A similar embodiment of the present invention could be used for objective selection process based on long-term quantitative data generated by the prospective candidate athlete, allowing coaching team to have an objective assessment of their training discipline and long-term performance track.

Referring to an eleventh specific application of the system or method, the peripheral sensors could be embedded or retrofitted in the blades of wind turbines to monitor the evolution of their condition with time as well as specific operational parameters such as vibrations at different orientation angles of the blade.

Referring to a twelfth application of the system or method, the peripheral sensors and sensors could be organized to map the motion and movements of a human operator, allowing the control a remote humanoid robot by movements of the individual's, head, trunk, arms, hands and legs, to perform needed task in a hazardous or arduous environment. Examples of such activities could include active firefighting and rescue operations, wounded extraction in military operations, and/or deep-see work for oil and gas exploration/extraction or space exploration/travel. An interesting implementation in sports could include humanoid teams controlled by the actual players, which would result in a major reduction of sports injuries such as traumatic brain injuries (TBI).

The system or method could be used with the instrument being worn by humans, by an animal, or being attached to an inanimate object such as a vehicle or a shipping pallet. Continuous monitoring can facilitate detection of any given variation in the parameters being monitored, after the occurrence of a given event. The event could be an impact, fall, spin/rotation or any internal malfunction stemming from viral, bacterial or mechanical imbalance in the system being monitored. The sensors system is also able to detect the event parameters in order to compare them to pre-established benchmarks.

In one embodiment and application, the instrument is wearable and comprises one or more sensors that incorporate MEMS technology. The MEMS technology sensor can be an accelerometer. The MEMS technology sensor can be a gyroscope. The MEMS technology sensor can be a magnetometer. The MEMS technology could be used to measure position, orientation, velocity, rotation, linear acceleration, angular acceleration, or higher order derivatives of position or rotation. The sensors in the instrument can comprise sensors that measure electromagnetic fields, radioactivity, temperature, pressure, altitude, position, pulse, heart rate, blood oxygen saturation or chemical parameters. The system further comprises transmitter low power instrument and wireless communications allowing the sensors to send the information to a remote electronic device for analysis, feedback and/or control.

In one embodiment, the system and method could be used to continuously monitor a variety of parameters related to motion, activity, performance, and/or neuro-motor status by measuring things such as gait patterns, speed, and/or acceleration. The system or method could also detect the occurrence of an event or series of events, such as impacts, falls, spins, or rotations and quantify the characteristics of an event, such as its magnitude, location, direction, frequency, and/or induced linear and rotational accelerations. Post-event, the system or method could detect any variation in the parameters being monitored.

The remote device that is part of the system or method could have embedded intelligence and algorithms that compare the event parameters to pre-established benchmarks and to generate one or more impact severity indicators to characterize the data that has been received that helps to describe or categorize the event. This impact severity indicator or indicators or other characterization information could be used to generate an alert based on a comparison with threshold values. Embedded intelligence and algorithms in the remote device could also compare the post-event performance, operational activity and behavior to pre-event levels and issues. This pre-event versus post-even comparison could be a direct comparison of pre and post data or it could be based on key activity and performance indicators that characterize activity "health". The remote device could also use an advanced algorithm that combines the impact severity scores with the activity and performance scores and to generate an event risk score, which could also be called a "key safety indicator."

In one embodiment, the remote device could store the sensor data and/or analysis information in a cloud database. The data in the cloud database could be compared and correlated with data related to circumstantial and environmental parameters including parameters related to the structure or physiology of the system being monitored. The correlated information can enable the optimization of scoring generation and threshold calibration based on the attributes of the system being monitored.

In the system or method is used in a sports application, the sensors in the instrument could continuously monitor the performance and activity of the players on the field, as well as the parameters of any event or events (such as an impact or series of impacts) affecting the player or players. The sensors in the instrument, in combination with the remote device could detect any variation in the performance and activity patterns as well as any variation in gait patterns and other neuromotor parameters. The embedded intelligence on the remote device could generate impact, activity, performance, and risk scores. In an embodiment used in a sports application, the system or method could include algorithms that personalize the risk score or scores based on the age, gender, height and weight of the player being measured. The system or method could take environmental parameters such as temperature, altitude, humidity, and barometric pressure at the time of the event into account to develop the risk score.

In one embodiment, the system or method could be configured to generate a haptic feedback control to a wearable or embedded device. The device receiving the haptic feedback could be an article of clothing, a head-worn unit, an arm-worn unit, a foot worn unit, a hand-worn unit, or any other wearable device. The actuators in the haptic feedback device could be actuated electro-mechanically, pneumatically, magnetically, piezoelectrically or using any other actuation technology capable of being understood by anyone skilled in the art. The signals activating the actuators could be triggered by the event or by any other parameter related to an activity.

These specific arrangements and methods described herein are merely illustrative of the principals of the present invention. Numerous modifications in form and detail may be made by those of ordinary skill in the art without departing from the scope of the present invention. Although this invention has been shown in relation to a particular embodiment, it should not be considered so limited. Rather, the present invention is limited only by the scope of the appended claims.

What is claimed is:

1. A motion analysis system for use in measuring a human risk factor in sports comprising a first wearable peripheral, a first wearable communication hub, a beacon, a data analysis server, and a cloud server, wherein:

the first wearable peripheral is configured to be worn by a first person;

the first wearable peripheral comprises:
  a first orientation sensor comprising an accelerometer, a magnetometer, and a gyroscope;
  a first wearable peripheral processor responsive to the first orientation sensor wherein the first wearable peripheral processor is configured for:
    receiving rotation rate information from the gyroscope wherein the gyroscope rotation rate information is responsive to angular rotation rates of the gyroscope in three orthogonal axes;
    mathematically integrating the gyroscope rotation rate information to generate gyroscope orientation information comprising orientation in three orthogonal axes;
    receiving an accelerometer pitch signal and an accelerometer roll signal wherein pitch and roll are rotations about two perpendicular axes orthogonal to a gravitational vector;
    receiving a magnetometer yaw signal responsive to yaw of the magnetometer wherein yaw is a rotation in a plane perpendicular to the gravitational vector; and
    generating an actual orientation measurement of the first wearable peripheral in response to the gyroscope orientation information, the accelerometer pitch signal, the accelerometer roll signal; and the magnetometer yaw signal;
    generating a predicted orientation signal of the first wearable peripheral in response to an orientation of the first wearable peripheral at a previous time;
    generating a first wearable peripheral residual signal in response to a comparison of the first wearable peripheral actual orientation measurement and the first wearable peripheral predicted orientation signal; and
    generating a first wearable peripheral fused orientation measurement in response to the first wearable peripheral residual signal and the first wearable peripheral actual orientation measurement; and
  a first wearable peripheral short-range communication module configured for transmitting a wireless signal responsive to the first orientation sensor using a radio frequency technology selected from the group of ANT, Bluetooth, LoRA, Near Field Communication, Neul, Sigfox, and Z-Wave;

the first wearable communication hub is configured to be worn by the first person;
the first wearable communication hub comprises a minimum of two wireless communication modules and a sensor comprising:
  a first wearable communication hub short-range communication module configured for receiving the first wearable peripheral short-range communication module wireless signal;
  a first wearable communication hub sensor selected from the group of an acceleration sensor, an altitude sensor, a chemical sensor, an electromagnetic sensor, a gyroscope, a human physiology sensor, a humidity sensor, an impact sensor, a magnetic sensor, a microphone, a position sensor, a pressure sensor, a temperature sensor, and a vibration sensor; and
  a first wearable communication hub long-range communication module configured for receiving and transmitting a wireless signal using a radio frequency technology selected from the group of Bluetooth, cellular, LoRA, Neul, satellite, Sigfox, WiFi, Zigbee, and Z-Wave wherein the first wearable communication hub long-range communication module signal is responsive to the first wearable peripheral short-range communication module signal and the first wearable communication hub sensor;
the beacon comprises:
  a beacon long-range communication module configured for receiving and transmitting information to and from the first wearable communication hub and the data analysis server; and
  a first beacon sensor wherein the first beacon sensor comprises a microphone;
the beacon is configured for stationary placement adjacent to a sports field;
the data analysis server comprises:
  a data analysis server long-range communication module configured for receiving information from the beacon long-range communication module wherein the beacon long-range communication module information comprises first orientation sensor information, first wearable communication hub sensor information, and first beacon sensor information;
  a data storage module responsive to the beacon long-range communication module information;
  a data analysis module responsive to the beacon long-range communication module information;
  a graphical data presentation module responsive to the data analysis module; and
  a data analysis server internet connection configured for communication over the internet; and
the cloud server comprises:
  a cloud server internet connection configured for communication over the internet with the data analysis server; and
  a web server wherein the web server is configured for assessing a human risk factor in response to:
    the first wearable peripheral fused orientation measurement; and
    the first wearable communication hub sensor.

2. The system of claim 1 wherein:
the first wearable peripheral is configured to be worn on the first person's head;
the first orientation sensor is configured to be responsive to a linear acceleration and a rotational acceleration;
the first wearable peripheral is configured to immediately send a signal if the acceleration of the first orientation sensor exceeds a threshold value;
the first wearable peripheral communications module is configured for transmitting a signal using a Bluetooth Class 3 protocol at 2.4 gigahertz;
the first wearable communication hub sensor comprises an impact sensor;
the first wearable communication hub long-range communication module is configured for transmitting a signal using a Bluetooth Class 1 protocol at 2.4 gigahertz;
the beacon further comprises:
  a fixed beacon configured for stationary placement;
  a cellular data modem configured for transmitting a signal over a cellular telephone network; and
  a second beacon sensor configured for measuring a position of the beacon; and
the graphical data presentation module is configured for displaying the number of times an acceleration event has occurred and the magnitude of each acceleration event.

3. The system of claim 1 wherein:
the first wearable peripheral is configured to be worn on the first person's head;
the first wearable peripheral processor is configured to change from a power-conserving sleep mode to an active mode in response to the first orientation sensor;
the first wearable peripheral processor is configured for generating the fused orientation measurement using a computation selected from the group of:
  a Kalman filter computation, wherein the Kalman filter computation comprises a linear, unbiased, recursive algorithm that optimally measures an unknown position from noisy first orientation data taken at discrete real-time intervals; and
  a Madgwick filter computation, wherein the Madgwick filter computation determines the fused orientation measurement by numerically integrating estimated orientation rates from the first orientation sensor;
the system further comprises a second wearable peripheral wherein the second wearable peripheral comprises:
  a second orientation sensor comprising a second accelerometer, a second magnetometer, and a second gyroscope wherein the second orientation sensor is responsive to movement of the first person's trunk;
  a second wearable peripheral processor responsive to the second orientation sensor wherein the second wearable peripheral processor is configured for:
    receiving rotation rate information from the second gyroscope wherein the gyroscope rotation rate information is responsive to angular rotation rates of the second gyroscope in three orthogonal axes;
    mathematically integrating the second gyroscope rotation rate information to generate second gyroscope orientation information comprising orientation in three orthogonal axes;
    receiving a second accelerometer pitch signal and a second accelerometer roll signal wherein pitch and roll are rotations about two perpendicular axes orthogonal to a gravitational vector;
    receiving a second magnetometer yaw signal responsive to yaw of the second magnetometer wherein yaw is a rotation in a plane perpendicular to the gravitational vector; and
    generating an actual orientation measurement of the second wearable peripheral in response to the second gyroscope orientation information, the second accelerometer pitch signal, the second accelerometer roll signal; and the second magnetometer yaw signal;

generating a predicted orientation signal of the second wearable peripheral in response to an orientation of the second wearable peripheral at a previous time;

generating a second wearable peripheral residual signal in response to a comparison of the second wearable peripheral actual orientation measurement and the second wearable peripheral predicted orientation signal; and generating a second wearable peripheral fused orientation measurement in response to the second wearable peripheral residual signal and the second wearable peripheral actual orientation measurement; and a second wearable processor short-range communication module configured for transmitting a wireless signal responsive to the first orientation sensor using a radio frequency technology selected from the group of ANT, Bluetooth, LoRA, Near Field Communication, Neul, Sigfox, and Z-Wave;

the first wearable communication hub long-range communication module signal is responsive to the second wearable peripheral fused orientation measurement; and the human sports risk factor system is configured for measuring relative motion of the human in response to a comparison of the first wearable peripheral fused orientation measurement and the second wearable peripheral fused orientation measurement.

4. The system of claim 1 wherein:

the first wearable peripheral processor is configured to change from a power-conserving sleep mode to an active mode in response an acceleration event wherein the acceleration event comprises an acceleration of the first person's head that is greater than a concussion threshold value;

the first wearable peripheral processor is configured for generating the actual orientation measurement of the first wearable peripheral in response to a quaternion wherein the quaternion comprises a scalar number, a first complex number, a second complex number, and a third complex number wherein:

the product of the first complex number and the second complex number equals the third complex number;

the product of the second and the third complex number equals the first complex number; and the product of the third and the first complex number equals the second complex number;

the first wearable communication hub comprises a global positioning sensor, a microphone, and a human physiology sensor;

the first wearable communication huh human physiology sensor is responsive to a human physiology parameter selected from the group of gait pattern, nystagmus, heart rate, speed, acceleration, and vestibulo-ocular reflex;

the first wearable communication hub long-range communication module is configured for communicating using Bluetooth Class 1 technology; and the data analysis server is configured for generating an alarm in response to:

the acceleration event;
the human physiology parameter at a time prior to the acceleration event; and
the human physiology parameter at a time after the acceleration event.

5. The system of claim 1 wherein:

the first wearable communication hub comprises a chemical sensor, an electromagnetic sensor, a gyroscope, a human physiology sensor, a humidity sensor, an impact sensor, a magnetic sensor, a microphone, a global positioning system sensor, a pressure sensor, a structural integrity sensor, a temperature sensor, and a vibration sensor; and the first wearable peripheral processor is configured for generating the actual orientation measurement of the first wearable peripheral in response to a mathematical representation of a 3-dimensional space using spherical coordinates in response to the gyroscope, the accelerometer pitch signal, the accelerometer roll signal, and the magnetometer yaw signal.

6. The system of claim 1 wherein:

the system comprises a second wearable peripheral and a second wearable communication hub configured to be worn by a second person;

the first wearable communication hub is configured for transmitting a first person position signal responsive to the position of the first person to the beacon; and the second wearable communication hub is configured for transmitting a second person position signal responsive to the position of the second person to the beacon;

the beacon comprises a position sensor; and the beacon is configured for:
improving the position accuracy of the first person; and
improving the position accuracy of the second person.

7. The system of claim 1 wherein:

the system is configured for assessing whether the first person has fallen; and the system is configured for assessing the human risk factor in response to a comparison of the gait pattern of the first person prior to the time when the first person has fallen with the gait pattern of the first person after the time when the first person has fallen.

8. The system of claim 1 wherein:

the system is configured for use in an American football application;

the first wearable peripheral is configured to be worn on the first person's head;

the first wearable peripheral further comprises a video camera;

the wearable peripheral video camera is configured for recording eye movement of the first person; and the system is configured for assessing the risk of a concussion to the first person in response to a nystagmus measurement using eye movement information recorded by the wearable peripheral video camera.

9. The system of claim 1 wherein:

the first orientation sensor comprises a nine-axis inertial measurement unit further comprising:
at least two axes of accelerometer rotation input;
three axes of accelerometer linear displacement input;
three axes of gyroscope rotational input; and
at least one axis of magnetometer orientation input;

the nine-axis inertial measurement unit further comprises a single monolithic integrated circuit;

the first sensor hub comprises a position sensor wherein the position sensor is responsive to a signal from a global positioning system satellite; and the data analysis module is responsive to the nine-axis inertial measurement unit and the first sensor hub position sensor.

10. A wireless system configured for measuring human motion in a sports environment, the system comprising a wearable peripheral, a communication hub, a beacon, a data analysis module, and a cloud server wherein:
the wearable peripheral is configured to be worn by a human;
the wearable peripheral comprises a first accelerometer, a gyroscope, a magnetometer, a processor, and a communication module wherein the first wearable peripheral processor is configured for:
receiving rotation rate information from the gyroscope wherein the gyroscope rotation rate information is responsive to angular rotation rates of the gyroscope in three orthogonal axes;
mathematically integrating the gyroscope rotation rate information to generate gyroscope orientation information comprising orientation in three orthogonal axes;
receiving a first accelerometer pitch signal and a first accelerometer roll signal wherein pitch and roll are rotations about two perpendicular axes orthogonal to a gravitational vector;
receiving a magnetometer yaw signal responsive to yaw of the magnetometer wherein yaw is a rotation in a plane perpendicular to the gravitational vector; and
generating an actual orientation measurement of first wearable peripheral in response to the gyroscope orientation information, the first accelerometer pitch signal, the first accelerometer roll signal; and the magnetometer yaw signal;
generating a predicted orientation signal of the first wearable peripheral in response to an orientation of the first wearable peripheral at a previous time;
generating a residual signal in response to a comparison of the actual orientation measurement and the predicted orientation signal; and
generating a fused orientation measurement in response to the residual signal and the actual orientation measurement;
the communication hub comprises:
a short-range communication module configured for receiving a signal from the wearable peripheral wireless communication module;
a sensor configured for measuring a parameter selected from the group of acceleration, altitude, chemistry, rotation, human physiology, humidity, impact, sound, position, pressure, temperature, and vibration; and
a long-range communication module configured for transmitting a wireless signal using a radio frequency technology;
the beacon comprises:
a module configured for receiving and transmitting information to and from the communication hub long-range communication module and the data analysis server; and
a a microphone;
the beacon is configured for placement adjacent to a sports field;
the data analysis module comprises:
a transmission element configured for receiving and transmitting information to and from the beacon;
a data storage element;
a data analysis element;
a graphical data presentation element; and
an internet connection; and
the cloud server comprises:
an internet connection configured for exchanging information with the data analysis module via the internet; and
a web server wherein the web server is configured for assessing a human risk factor in response to:
the fused orientation measurement; and
the communication hub sensor.

11. The system of claim 10 wherein:
the wearable peripheral communication module is configured to transmit using a wireless radio frequency technology selected from the group of ANT, Bluetooth, LoRA, Near Field Communication, Neul, Sigfox, and Z-Wave;
the communication hub long-range communication module is configured to transmit and receive using a radio frequency technology selected from the group of Bluetooth, cellular, LoRA, Neul, satelliLe, Sigfox, WiFi, Zigbee, and Z-Wave;
the communication hub is configured to be worn by the human;
the communication hub comprises a position sensor responsive to a triangulation position information received from a plurality of stationary beacons; and
the beacon is configured for stationary placement at a fixed location.

12. The system of claim 10 wherein:
the first accelerometer is responsive to linear acceleration and rotational acceleration in a plurality of axes;
the first accelerometer generates a tilt signal relative to a gravitational vector wherein:
the tilt signal is measured as a response of a projection of static gravity on the tilted first accelerometer;
the first accelerometer is most sensitive to tilt when the accelerometer is perpendicular to gravity; and
the tilt signal comprises a pitch signal and a roll signal where pitch and roll are rotations about two perpendicular axes orthogonal to the gravitational vector;
the wearable peripheral processor is configured for generating the actual orientation measurement of the first wearable peripheral in response to a mathematical representation of a 3-dimensional space using spherical coordinates in response to the gyroscope, the accelerometer pitch signal, the accelerometer roll signal, and the magnetometer yaw signal;
the system is configured for generating an alarm in response to an analysis of an acceleration event measured by the first accelerometer; and
the system records the time when the acceleration event occurs.

13. The system of claim 10 wherein:
the communication hub comprises a human physiology sensor configured for measuring a physiologic parameter for the human wherein the physiologic parameter comprises a gait pattern; and
the data analysis module is configured for generating a brain injury alarm in response to an analysis of:
an acceleration event measured by the first accelerometer;
the gait pattern prior to the acceleration event; and
the gait after the acceleration event.

14. The system of claim 10 wherein:
the wearable peripheral is configured to be worn on a finger of the human;

the system further comprises:
- a second accelerometer configured to be worn on the thumb of the human;
- a third accelerometer configured to be worn on the wrist of the human;
- a fourth accelerometer configured to be worn on the upper arm of the human;
- a fifth accelerometer configured to be worn on the torso of the human;
- a sixth accelerometer configured to be worn on the head of the human; and
- a seventh accelerometer configured to be worn on the leg of the human; and the system is configured for assessing the human risk factor in response to:
- the second accelerometer;
- the third accelerometer;
- the fourth accelerometer;
- the fifth accelerometer;
- the sixth accelerometer; and
- the seventh accelerometer.

15. A method for wireless communication and analysis of sensed human motion information in a sports environment comprising the steps of:
- establishing a human-wearable peripheral comprising an accelerometer, a magnetometer, a gyroscope, a processor and a communication module;
- generating a fused orientation measurement in the human-wearable peripheral by:
  - receiving rotation rate information from the gyroscope wherein the gyroscope rotation rate information is responsive to angular rotation rates of the gyroscope in three orthogonal axes;
  - mathematically integrating the gyroscope rotation rate information to generate gyroscope orientation information comprising orientation in three orthogonal axes;
  - receiving an accelerometer pitch signal and an accelerometer roll signal wherein pitch and roll are rotations about two perpendicular axes orthogonal to a gravitational vector;
  - receiving a magnetometer yaw signal responsive to yaw of the magnetometer wherein yaw is a rotation in a plane perpendicular to the gravitational vector; and
  - generating an actual orientation measurement of first wearable peripheral in response to the gyroscope orientation information, the accelerometer pitch signal, the accelerometer roll signal; and the magnetometer yaw signal;
  - generating a predicted orientation signal of the first wearable peripheral in response to an orientation of the first wearable peripheral at a previous time;
  - generating a residual signal in response to a comparison of the actual orientation measurement and the predicted orientation signal; and
  - generating a fused orientation measurement in response to the residual signal and the actual orientation measurement;
- establishing a communication hub comprising:
  - a receiver configured for receiving a signal from the human-wearable peripheral communication module;
  - a sensor selected from the group of an acceleration sensor, an altitude sensor, a chemical sensor, an electromagnetic sensor, a gyroscope, a human physiology sensor, a humidity sensor, an impact sensor, a magnetic sensor, a microphone, a position sensor, a pressure sensor, a temperature sensor, and a vibration sensor; and
  - a transmitter configured for transmitting and receiving a wireless signal using a radio frequency technology;
- establishing a data analysis device comprising:
  - a long-range communication module configured for receiving and transmitting information;
  - a data storage module;
  - a data analysis module;
  - a graphical presentation module; and
  - an internet connection;
- establishing a beacon comprising:
  - a long-range communication module configured for receiving and transmitting information to and from the communication hub and the data analysis device; and
  - a microphone;
- establishing a cloud server comprising an internet connection configured for communication over the internet with the data analysis device;
- assessing a human risk factor in response to:
  - the fused orientation measurement; and
  - the first wearable communication hub sensor.

16. The method of claim 15 wherein:
- the wearable peripheral comprises a 9-axis inertial measurement unit comprising a at least two axes of accelerator rotation input, three axes of accelerometer linear displacement input, three axes of gyroscope rotational input, and at least one axis of magnetometer orientation input;
- generating a fused orientation measurement comprises the steps of:
  - representing a first orientation of the wearable peripheral using spherical coordinates in response to the gyroscope, the accelerometer pitch signal, the accelerometer roll signal, and the magnetometer yaw signal;
  - converting the first orientation of the wearable peripheral to a quaternion wherein the quaternion comprises a scalar number, a first complex number, a second complex number, and a third complex number wherein:
    - the product of the first complex number and the second complex number equals the third complex number;
    - the product of the second and the third complex number equals the first complex number; and
    - the product of the third and the first complex number equals the second complex number;
  - rotating the first orientation of the wearable peripheral to a second orientation of the wearable peripheral in response to the gyroscope, the accelerometer pitch signal, the accelerometer roll signal, the accelerometer yaw signal, and a quaternion rotation computation; and
  - converting the second orientation of the wearable peripheral from a quaternion back to spherical coordinates.

17. The sports risk measurement system of claim 1 wherein:
the system is configured for assessing the human risk factor in response to age, gender, height, and weight of the first person.

18. The sports risk measurement system of claim 1 wherein:

the system is configured for assessing the human risk factor in response to correlation information of past concussions wherein the past concussion correlation data comprises:
past impact data for the first person;
temperature data; and
demographic data.

19. The sports risk measurement system of claim 1 wherein:
the first wearable peripheral further comprises a video camera;
the wearable peripheral video camera is configured for recording eye movement of the first person; and
the system is configured for measuring vestibular ocular reflex performance using eye movement information recorded by the wearable peripheral video camera.

20. The sports risk measurement system of claim 1 wherein:
the first wearable peripheral further comprises an electroencephalograph; and
the system is configured for assessing the risk of a concussion in response to the electroencephalograph.

\* \* \* \* \*